(12) United States Patent
Schwartz et al.

(10) Patent No.: US 8,185,733 B2
(45) Date of Patent: *May 22, 2012

(54) METHOD AND APPARATUS FOR AUTOMATICALLY PUBLISHING CONTENT BASED IDENTIFIERS

(75) Inventors: Edward L. Schwartz, Sunnyvale, CA (US); Greg Wolff, Palo Alto, CA (US); Michael J. Gormish, Redwood City, CA (US); Kurt Piersol, Campbell, CA (US)

(73) Assignee: Ricoh Co., Ltd., Tokyo (JP)

( * ) Notice: Subject to any disclaimer, the term of this patent is extended or adjusted under 35 U.S.C. 154(b) by 523 days.

This patent is subject to a terminal disclaimer.

(21) Appl. No.: 12/244,716

(22) Filed: Oct. 2, 2008

(65) Prior Publication Data

US 2010/0088512 A1  Apr. 8, 2010

(51) Int. Cl.
*H04L 29/06* (2006.01)
*H04L 9/32* (2006.01)

(52) U.S. Cl. ........ 713/159; 713/154; 713/160; 713/176; 713/181

(58) Field of Classification Search .................. 713/168, 713/154, 159, 160, 176, 181
See application file for complete search history.

(56) References Cited

U.S. PATENT DOCUMENTS

| | | |
|---|---|---|
| 4,809,158 A | 2/1989 | McCauley |
| 5,396,622 A | 3/1995 | Lee et al. |
| 5,495,608 A | 2/1996 | Antoshenkov |
| 5,592,618 A | 1/1997 | Micka et al. |
| 5,708,780 A | 1/1998 | Levergood et al. |
| 5,778,388 A | 7/1998 | Kawamura et al. |
| 5,845,292 A | 12/1998 | Bohannon et al. |
| 5,949,876 A | 9/1999 | Ginter et al. |
| 5,978,475 A * | 11/1999 | Schneier et al. ............... 713/177 |
| 6,044,381 A | 3/2000 | Boothby |
| 6,065,018 A | 5/2000 | Beier et al. |
| 6,192,365 B1 | 2/2001 | Draper et al. |
| 6,236,988 B1 | 5/2001 | Aldred |
| 6,289,356 B1 | 9/2001 | Hitz et al. |
| 6,308,175 B1 | 10/2001 | Lang et al. |
| 6,341,316 B1 | 1/2002 | Kloba et al. |
| 6,345,288 B1 | 2/2002 | Reed et al. |
| 6,360,215 B1 | 3/2002 | Judd et al. |
| 6,363,363 B1 | 3/2002 | Haller et al. |
| 6,400,845 B1 | 6/2002 | Volina |
| 6,418,421 B1 | 7/2002 | Hurtado et al. |

(Continued)

FOREIGN PATENT DOCUMENTS

EP  0 443 972  8/1991

(Continued)

OTHER PUBLICATIONS

"ATTRIB," PC Computer Notes & Online Tutorials, <http://web.archive.org/web/20021204074423/http://www.pccomputernotes.com/operating_systems/dos04.htm>, Dec. 4, 2002, 5 pages.

(Continued)

*Primary Examiner* — Mohammad Reza
(74) *Attorney, Agent, or Firm* — Blakely, Sokoloff, Taylor & Zafman LLP

(57) ABSTRACT

A method and apparatus for automatically publishing content based identifiers are described. In one embodiment, the method comprises accessing an electronic communication to obtain a content based identifier (CBI) contained in the electronic communication. In one embodiment, the method may also comprise using the CBI to validate integrity of a hash chained log.

17 Claims, 8 Drawing Sheets

U.S. PATENT DOCUMENTS

| | | | |
|---|---|---|---|
| 6,453,427 B2 | 9/2002 | Quach et al. | |
| 6,463,427 B1 | 10/2002 | Wu | |
| 6,499,665 B1 | 12/2002 | Meunier et al. | |
| 6,522,770 B1 | 2/2003 | Seder et al. | |
| 6,546,385 B1 | 4/2003 | Mao et al. | |
| 6,557,004 B1 | 4/2003 | Ben-Shachar et al. | |
| 6,574,627 B1 | 6/2003 | Bergadano et al. | |
| 6,584,477 B1 | 6/2003 | Mosher, Jr. | |
| 6,615,208 B1 | 9/2003 | Behrens et al. | |
| 6,631,469 B1 | 10/2003 | Silvester | |
| 6,631,496 B1 | 10/2003 | Li et al. | |
| 6,640,301 B1 | 10/2003 | Ng | |
| 6,661,933 B1 | 12/2003 | Hisatomi | |
| 6,687,696 B2 | 2/2004 | Hofmann et al. | |
| 6,697,948 B1 | 2/2004 | Rabin et al. | |
| 6,754,773 B2 | 6/2004 | Ulrich et al. | |
| 6,771,885 B1 | 8/2004 | Agnihotri et al. | |
| 6,807,632 B1* | 10/2004 | Carpentier et al. | 713/165 |
| 6,862,728 B2 | 3/2005 | Darnell et al. | |
| 7,054,626 B2 | 5/2006 | Rossmann et al. | |
| 7,203,796 B1 | 4/2007 | Muppalaneni et al. | |
| 7,249,258 B2* | 7/2007 | Honda et al. | 713/176 |
| 7,278,115 B1 | 10/2007 | Conway et al. | |
| 7,340,450 B2 | 3/2008 | Sugahara et al. | |
| 7,406,487 B1 | 7/2008 | Gupta et al. | |
| 7,478,120 B1 | 1/2009 | Zhang | |
| 7,555,196 B1 | 6/2009 | Crawford et al. | |
| 7,574,605 B2* | 8/2009 | Tanimoto et al. | 713/177 |
| 7,806,342 B2 | 10/2010 | Lapstun et al. | |
| 7,853,564 B2* | 12/2010 | Mierau et al. | 707/638 |
| 7,890,598 B2* | 2/2011 | Lakamp | 709/217 |
| 7,962,546 B2* | 6/2011 | Colon | 709/203 |
| 2002/0004800 A1 | 1/2002 | Kikuta et al. | |
| 2002/0023221 A1 | 2/2002 | Miyazaki et al. | |
| 2002/0046072 A1 | 4/2002 | Arai et al. | |
| 2002/0055942 A1 | 5/2002 | Reynolds | |
| 2002/0095454 A1 | 7/2002 | Reed et al. | |
| 2002/0103848 A1 | 8/2002 | Giacomini et al. | |
| 2002/0116379 A1 | 8/2002 | Lee et al. | |
| 2002/0120484 A1 | 8/2002 | Bantz et al. | |
| 2002/0126872 A1 | 9/2002 | Brunk et al. | |
| 2002/0184180 A1 | 12/2002 | Debique et al. | |
| 2003/0016980 A1 | 1/2003 | Meunier et al. | |
| 2003/0021441 A1 | 1/2003 | Levy et al. | |
| 2003/0021677 A1 | 1/2003 | Masutani | |
| 2003/0046586 A1 | 3/2003 | Bheemarasetti et al. | |
| 2003/0050863 A1 | 3/2003 | Radwin | |
| 2003/0053655 A1 | 3/2003 | Barone et al. | |
| 2003/0083040 A1* | 5/2003 | Ruth et al. | 455/405 |
| 2003/0088593 A1 | 5/2003 | Stickler | |
| 2003/0123447 A1 | 7/2003 | Smith | |
| 2003/0126148 A1 | 7/2003 | Gropper et al. | |
| 2003/0126276 A1 | 7/2003 | Kime et al. | |
| 2003/0131240 A1 | 7/2003 | Greene et al. | |
| 2003/0145207 A1 | 7/2003 | Jakobsson et al. | |
| 2003/0158944 A1 | 8/2003 | Branson et al. | |
| 2003/0191764 A1 | 10/2003 | Richards | |
| 2003/0212677 A1 | 11/2003 | Chen et al. | |
| 2003/0236857 A1 | 12/2003 | Takase et al. | |
| 2004/0030681 A1 | 2/2004 | Shannon et al. | |
| 2004/0064693 A1 | 4/2004 | Pabla et al. | |
| 2004/0064833 A1 | 4/2004 | Lee et al. | |
| 2004/0068652 A1 | 4/2004 | Carpentier et al. | |
| 2004/0075866 A1 | 4/2004 | Thormodsen et al. | |
| 2004/0078337 A1 | 4/2004 | King et al. | |
| 2004/0117627 A1 | 6/2004 | Brewington | |
| 2004/0177067 A1 | 9/2004 | Takeda | |
| 2004/0177281 A1 | 9/2004 | Balaz et al. | |
| 2004/0220975 A1 | 11/2004 | Carpentier et al. | |
| 2004/0225655 A1 | 11/2004 | Moulton | |
| 2004/0244039 A1 | 12/2004 | Sugahara et al. | |
| 2004/0260593 A1 | 12/2004 | Abraham-Fuchs et al. | |
| 2005/0038756 A1 | 2/2005 | Nagel | |
| 2005/0038809 A1 | 2/2005 | Abajian et al. | |
| 2005/0055343 A1 | 3/2005 | Krishnamurthy | |
| 2005/0071209 A1 | 3/2005 | Tatavu et al. | |
| 2005/0091229 A1 | 4/2005 | Bali et al. | |
| 2005/0114452 A1 | 5/2005 | Prakash | |
| 2005/0114709 A1 | 5/2005 | Moore | |
| 2005/0210059 A1 | 9/2005 | Albornoz et al. | |
| 2005/0262243 A1 | 11/2005 | Ternasky et al. | |
| 2005/0267885 A1 | 12/2005 | Klier | |
| 2005/0289187 A1 | 12/2005 | Wong et al. | |
| 2006/0010095 A1 | 1/2006 | Wolff et al. | |
| 2006/0036579 A1 | 2/2006 | Byrd et al. | |
| 2006/0047967 A1 | 3/2006 | Akhan et al. | |
| 2006/0056653 A1 | 3/2006 | Kunisa | |
| 2006/0093241 A1 | 5/2006 | Nakamura et al. | |
| 2006/0101007 A1 | 5/2006 | Go | |
| 2006/0129576 A1* | 6/2006 | Carpentier et al. | 707/100 |
| 2006/0139622 A1 | 6/2006 | Mann | |
| 2006/0149558 A1 | 7/2006 | Kahn et al. | |
| 2006/0150079 A1 | 7/2006 | Albornoz et al. | |
| 2006/0195886 A1 | 8/2006 | Ashley | |
| 2006/0218204 A1 | 9/2006 | Ofer et al. | |
| 2006/0230081 A1 | 10/2006 | Craswell et al. | |
| 2006/0271787 A1 | 11/2006 | DeYoung et al. | |
| 2007/0086061 A1 | 4/2007 | Robbins | |
| 2007/0094467 A1 | 4/2007 | Yamasaki | |
| 2007/0143356 A1 | 6/2007 | Kleinsmith et al. | |
| 2007/0170250 A1 | 7/2007 | Bystrom et al. | |
| 2007/0219942 A1 | 9/2007 | Wolff et al. | |
| 2007/0244920 A1 | 10/2007 | Palliyil et al. | |
| 2008/0002243 A1 | 1/2008 | Cowburn | |
| 2008/0019505 A1 | 1/2008 | Thomas | |
| 2008/0059800 A1 | 3/2008 | Piersol | |
| 2008/0071646 A1 | 3/2008 | Hodson et al. | |
| 2008/0104407 A1 | 5/2008 | Horne et al. | |
| 2008/0243688 A1 | 10/2008 | Hart et al. | |
| 2008/0250100 A1* | 10/2008 | Hatanaka et al. | 709/203 |
| 2009/0089337 A1* | 4/2009 | Perlin et al. | 707/200 |
| 2009/0164506 A1* | 6/2009 | Barley et al. | 707/102 |
| 2009/0328218 A1* | 12/2009 | Tsurukawa | 726/23 |

FOREIGN PATENT DOCUMENTS

| | | |
|---|---|---|
| EP | 1 594 252 | 11/2005 |
| EP | 1 622 074 | 2/2006 |
| JP | 2001092827 | 4/2001 |
| WO | WO 03071394 | 8/2003 |

OTHER PUBLICATIONS

"EP1804180 International Search Report," EP Appl No. 06027063.4-1527, Apr. 18, 2007, 6 pages.

Blanton, "Microsoft Computer Dictionary," Microsoft Press, Fifth Edition, Jan. 22, 2002, p. 578.

European Search Report dated Oct. 31, 2008, for European Application No. 08153371.3, 7 pages.

Flickr, "Photo tags," http://web.archive.org/web/20040607054247/http://www.flickr.com/photos/tags/, Jun. 7, 2004, 1 page.

Google Search, <http://www.google.com/search?hl=en&rls=GGLD%2CGGLD%...h+values+as+identifiers & aq=f&aqi=&aq1 =&oq=&gs_rfai=>, Apr. 7, 2010, 2 pages.

Hisashi, Toyoshima, et al, "Hysteresis Signature and its Related Technologies to Maintain the Digital Evidence for Network Activities in Future Soceity," Journal of the National Institute of Information and Communications Technology, vol. 52, Nos. 1/2, 2005, pp. 191-201.

Phan, et al, "Challenge: Integrating Mobile Wireless Devices Into the Computational Grid," MOBICOM'02, Sep. 23-28, 2002, pp. 271-278.

Tkachenko, "Log file in XML format?," (http://www.tkachenko.com/blog/archives/000053.html) Jul. 22, 2003, 1-4.

U.S. Final Office Action for corresponding U.S. Appl. No. 11/804,435, (P172D2) Jun. 7, 2010, 11 pgs.

U.S. Final Office Action for corresponding U.S. Appl. No. 11/804,635, (P172D) Jan. 7, 2010, 9 pgs.

U.S. Final Office Action for corresponding U.S. Appl. No. 10/887,998, (P172) Sep. 15, 2010, 16 pgs.

U.S. Final Office Action for corresponding U.S. Appl. No. 10/887,998, (P172) Nov. 17, 2009, 11 pgs.

U.S. Final Office Action for corresponding U.S. Appl. No. 10/887,998, (P172) Dec. 22, 2008, 9 pgs.

U.S. Final Office Action for corresponding U.S. Appl. No. 10/887,998, (P172) Jan. 8, 2008, 8 pgs.
U.S. Final Office Action for corresponding U.S. Appl. No. 11/322,435, (P179) dated Jun. 25, 2009, 27 pgs.
U.S. Final Office Action for corresponding U.S. Appl. No. 11/322,435, (P179) dated May 7, 2010, 28 pgs.
U.S. Final Office Action for corresponding U.S. Appl. No. 11/322,435, (P179) dated Sep. 11, 2008, 26 pgs.
U.S. Final Office Action for corresponding U.S. Appl. No. 11/692,784, (P206) dated Feb. 3, 2009, 18 pgs.
U.S. Final Office Action for corresponding U.S. Appl. No. 11/692,784, (P206) dated Jun. 9, 2010, 19 pgs.
U.S. Office Action for corresponding U.S. Appl. No. 11/692,784 dated Apr. 13, 2011, 29 pgs.
U.S. Office Action for corresponding U.S. Appl. No. 11/804,435, (P172D2) Jun. 18, 2009, 10 pgs.
U.S. Office Action for corresponding U.S. Appl. No. 11/804,435, (P172D2) Dec. 30, 2009, 7 pgs.
U.S. Office Action for corresponding U.S. Appl. No. 11/804,435, (P172D2) Oct. 4, 2010, 11 pgs.
U.S. Office Action for corresponding U.S. Appl. No. 11/804,635 dated Apr. 27, 2011, 17 pgs.
U.S. Office Action for corresponding U.S. Appl. No. 11/804,635, (P172D) Jun. 22, 2009, 9 pgs.
U.S. Office Action for corresponding U.S. Appl. No. 11/804,635, (P172D) Jul. 22, 2010, 13 pgs.
U.S. Office Action for corresponding U.S. Appl. No. 10/887,998, (P172) May 11, 2009, 12 pgs.
U.S. Office Action for corresponding U.S. Appl. No. 10/887,998, (P172) Jul. 12, 2007, 8 pgs.
U.S. Office Action for corresponding U.S. Appl. No. 10/887,998, (P172) Mar. 30, 2007, 5 pgs.
U.S. Office Action for corresponding U.S. Appl. No. 10/887,998, (P172) Apr. 8, 2010, 11 pgs.
U.S. Office Action for corresponding U.S. Appl. No. 10/887,998, (P172) Jul. 28, 2008, 8 pgs.
U.S. Office Action for corresponding U.S. Appl. No. 11/322,435, (P179) dated Feb. 15, 2008, 24 pgs.
U.S. Office Action for corresponding U.S. Appl. No. 11/322,435, (P179) dated Jan. 30, 2009, 27 pgs.
U.S. Office Action for corresponding U.S. Appl. No. 11/322,435, (P179) dated Jan. 4, 2010, 26 pgs.
U.S. Office Action for corresponding U.S. Appl. No. 11/692,784, (P206) dated Aug. 5, 2008, 14 pgs.
U.S. Office Action for corresponding U.S. Appl. No. 11/692,784, (P206) dated Jul. 22, 2009, 20 pgs.
Lee, Jae-il, et al, "A Model for Embedding and Authorizing Digital Signatures in Printed Documents," 2002, 14 pages.
European Patent Office (Registered Letter) with Partial European Search Report for EP 07 25 33 88, mailed Jan. 25, 2008, 5 pages.
European Search Report dated May 5, 2006, for European Application No. 07253388.8, 11 pages.
European Search Report dated Aug. 11, 2008, for European Application No. 08153379.6-1225.
Li, Tao, et al, "An Integrated Framework on Mining Logs Files for Computing System Management," Proceedings of the Eleventh ACM SIGKDD International Conference on Knowledge Discover in Data Mining, [Online], Aug. 21-24, 2005, pp. 776-781, XP002480863, Chicago, IL.
Chen, et al, "EFC—Event Correlation for Forensics," Internet Citation, [Online], Nov. 25, 2003, XP002441540.

* cited by examiner

METHOD AND APPARATUS FOR AUTOMATICALLY PUBLISHING CONTENT BASED IDENTIFIERS

FIELD OF THE INVENTION

The present invention relates to the field of digital object distribution; more particularly, the present invention relates to automatically publishing content based identifiers.

BACKGROUND OF THE INVENTION

Electronic communication, such as email, is now widely used for business purposes. Many businesses store certain electronic communications according to data retention policies. Furthermore, businesses may be required by law to store certain electronic communications. These retained communications may later be used in legal proceedings.

However, electronic communications that include text, audio, image, and video data may easily be edited, resulting in various levels of consumer data manipulation. Thus, the integrity of text, audio, video, etc. data cannot be trusted. With government and law enforcement agencies increasingly utilizing digital document, photographs, videos, and audio recordings, the problems associated with the lack of reliable indicators of integrity becomes more acute.

Many data management systems have been proposed and implemented in the past. These data management systems include systems that store documents, electronic photographs, digital music, as well as other data, and respond to a variety of requests. However, these systems do not easily operate across organizational boundaries and do not perform necessary synchronization and verification e.g., in the case of an audit.

A log is a data management tool used to record information. Logs may use a client-server framework to permit the addition or subtraction of content from one or more client locations to a server that hosts the web log. Because one server hosts each log, web logs are typically anchored to a particular HTTP location.

Logs are designed to provide a reliable history which in turn provides the basis of trust. Current business processes such as double entry accounting and paper trails provide traceability and support for auditing. Verification of electronic log files is necessary to provide similar accountability to that provided by paper. Verification of logs is critical in ensuring the integrity of a log, the log's history, and content referenced by the log.

SUMMARY OF THE INVENTION

A method and apparatus for automatically publishing content based identifiers are described. In one embodiment, the method comprises accessing an electronic communication to obtain a content based identifier (CBI) contained in the electronic communication. In one embodiment, the method may also comprise using the CBI to validate integrity of a hash chained log.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
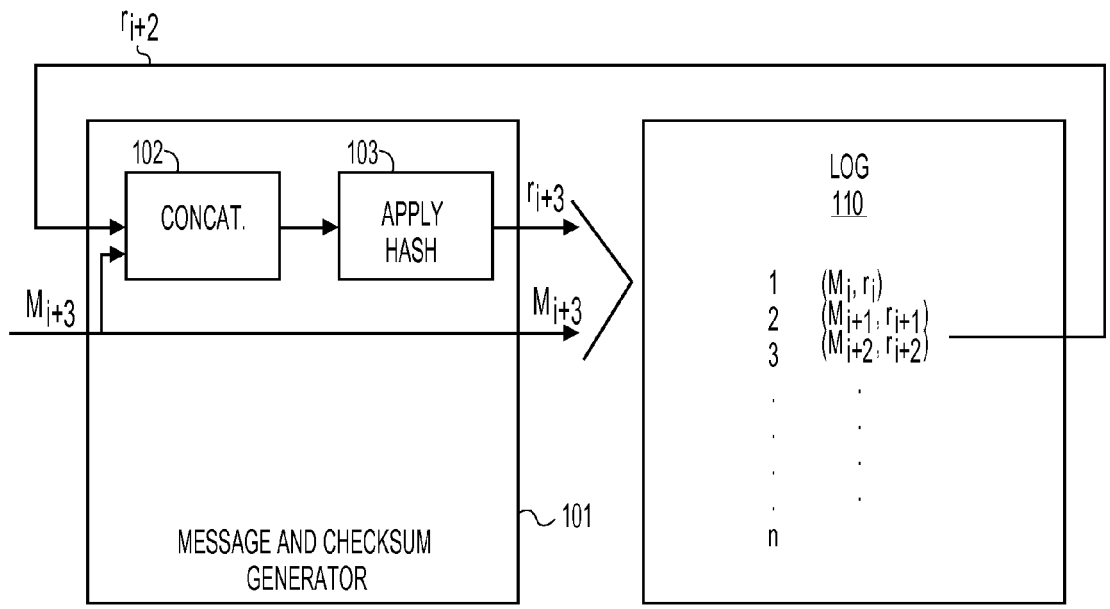
FIG. 1 illustrates generating and storing an entry in a log.

A method, apparatus, and article of manufacture for automatically publishing content based identifiers are described. In one embodiment, the method comprises accessing an electronic communication to obtain a content based identifier (CBI) contained in the electronic communication. In one embodiment, the method may also comprise using the CBI to validate integrity of a hash chained log.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Media Identifiers, Sequential Logs, and Entangling
Media Identifiers for Electronic Items Many of the embodiments described herein require the ability to refer to a document, video, song, an image of a piece of paper, electronic file, etc. by an identifier. For purposes herein, the document, video, song, piece of paper, electronic file, etc. are referred herein to as the media. An identifier used to identify the media is called a media identifier and, in one embodiment, is a string of bytes.

In one embodiment, there are several properties of the association between the media and the media identifier which are useful in the embodiments described herein: a) it is beneficial that anyone who has the media can determine an identical media identifier; b) it is beneficial that it is difficult for anyone to find two distinct pieces of media that have the same media identifier; c) it is beneficial that the media identifier does not reveal anything about the content of the media; and d) it is beneficial that any change to the media would result in a different identifier.

There are multiple ways to assign an identifier to a piece of media. For an electronic file, in one embodiment, the identifier is generated by applying a cryptographic hash function to the bytes of the file. Cryptographic hash functions are well known in the communications and security literature and have been standardized in various federal and international standards, and software toolkits.

Cryptographic hash functions meet the properties described above so well that the process of determining an identifier for a piece of media is sometimes referred to as "hashing" and the media identifier is at times referred to as a "hash," even if a different technique is used to determine the identifier. We refer to a media identifier computed with a cryptographic hash as a Content Based Identifier, or CBI. In one embodiment, a Content Based Identifier includes a prefix as well as the hash. In one embodiment, the prefix is used to identify the function used to compute the hash, e.g., "sha1" for the Secure Hash Algorithm SHA-1 hash function.

There are other ways to assign identifiers to files. For example, a server could keep a copy of every file and assign a previously unused string randomly to each new file. This method works very well for properties b, c, and d, but only meets property a if everyone can contact the server, and the server cannot be changed, even if taken off-line by, for example, by a denial of service attack.

It is also possible to use functions that are simpler than cryptographic hashes to identify files. For example, a simple checksum can be used on a file, and the result used as a media identifier. This meets properties a and c, but not property b. While most changes to a file will result in a different simple checksum, the simplicity of the checksum means it is easy to come up with a set of strings that can be added to a file without changing the checksum. Therefore property d is not well met by the simple checksum. For some applications these properties may be less important. Also some applications may have very structured data, such that it is difficult to find two pieces of media that both have the same checksum and follow the rules of the structured data. Thus, in one embodiment, a content based identifier is not a cryptographic hash.

In one embodiment, physical pieces of paper are assigned an identifier, for example, by scanning the paper and computing a cryptographic hash of the scanned file that results. However, because of noise in the scanning process, different scans of the paper normally lead to different electronic files, and thus different identifiers. For this reason, it is sometimes convenient to affix a barcode or other machine readable identifier (e.g., a RFID tag) to a piece of paper or other physical device. Use of a machine readable ID makes it easy for anyone to determine the same identifier from different copies of a document for example; however, it is also possible to attach the same ID value to different media, so properties b and d are not well met in this case.

In one embodiment, to overcome the weakness of machine readable ID's, a form of "finger printing" is used to identify physical media. Since finger printing associates values with the physical device, it can be very hard or impossible to make a new "finger" or piece of paper with the same finger print. However, in many cases, the "finger print" reveals something about the physical media, also it may be possible to change the physical media slightly without changing the finger print. Thus, in such a case, properties c and d might not be held perfectly.

In one embodiment, multiple identifiers are associated with a single piece of media. For example, there could be an identifier formed by using the SHA 1 cryptographic hash function on the media, and an identifier formed by using the SHA256 or MD5 cryptographic hashes on the same media. In one embodiment, keyed-hash message authentication codes or HMAC are used to compute media identifiers. These message authentication codes like HMAC-MD5 or HMAC-SHA1 can be better than the underlying cryptographic hash functions (MD5 and SHA1) for properties B, C, and D because they use a key which can change. However, property A is more difficult with message authentication codes because in order to compute the same hash, all places computing it must have access to the key.

In one embodiment, different identifiers are associated with different formats of the same data. For example, the hash of a file and the hash of the ".zip" file obtained by lossless compression of the file, are different identifiers, but they are associated with the same final data.

In one embodiment, identifiers are formed for part of the media. For example, in the case of video, there could be an identifier formed for each different frame. Because of packet loss in a network, two people watching the same video might not end up with the same file, and thus they would be unable to compute the same identifier. However, each person would receive several identical frames of the video. So if they computed a hash of each frame they received, they could determine that they were watching the same video because of the large number of identical hashes.

To continue the same example, two people watching the same video might watch it at different resolutions; in this case, no two frames will have the same hash. However, if the video was stored in a scalable method, e.g. JPEG 2000 part 3, then the lowest resolution portion of the video may be the same for both viewers, and common hashes could be determined.

When video is not stored in a scalable format, a server typically stores multiple versions of a video at different resolutions. The server can thus compute a hash of all frames of all resolutions it has stored, and thus any frame received completely by a client can be hashed and the hashes later compared with those on the server to identify the video.

In addition to video, there are other types of media that may be partially transmitted. Portions of document images in PDF, JPM, or JPEG 2000 can be transmitted with a variety of resolutions, qualities, or sets of pages. XML documents may also be partially transmitted. For example, part of a large XML document may be requested. The request may be, for example, by an XPATH query. The portion of the document received by the client is different from the whole document available at the server. However, it is possible to compute hashes for portions of the documents (e.g., subtrees of the XML document) or even contents of particular nodes in the XML document. A client with a subset of the XML document can compute hashes on the subtrees and nodes that it receives, and these can be matched against a large list of hashes at the server.

For any particular media, relevant subsets of the data can often be determined and these subsets can be hashed in addition to the hash of the complete media.

In some cases, the data is processed so that the portion delivered does not actually appear in the data as a whole. For example, a color image might be converted to grayscale and then delivered, or the sum of entries in a spreadsheet might be computed and reported. However, if the data exists at two places (e.g. the server and client), then even if only modified data is delivered, it is possible for both server and client to record hashes of the modified data and the association between the received data and its source can be made at a later time.

In some cases, the "server" might not have the modified data initially. For example, if an intermediate processing device performs the computation on the data. However, if the type of computation is known, it could be later run on the server to associate the original media with the received data. For example, a server might send a high bit rate video, but due to network congestion, the video may be truncated by removing a quality layer at an intermediate router. A client thus receives a medium bit-rate video that can be hashed. In order to determine the same hashes, the server runs the hash on the high rate video without the quality layer that the router discarded.

Sequential Logs

Many of the embodiments described herein involve recording a sequence of events. The record of events is referred to as a "log" or "log-file," similar to the relationship with a log book used to record the events of a truck, ship, or aircraft, and the log files used to record the actions taken on computer systems. In one embodiment, the logs have a property that it is easy to add a new record to the end, but difficult to change a record already in the log without such a change being easily detected.

Unlike a traditional "log book" or "log file", in one embodiment, it is desirable for the log not to disclose much information about the event being recorded. In this way, the log file may be made available to a large number of people or systems so that some records can be checked, but the content of most of the records can remain secret.

There are several possible implementations of a log which have different levels of performance with respect to the goals of easy to add, hard to change, and partial disclosure of information.

A conceptually simple way to implement a log is a tamper-proof write once memory. Each record is written in order into the memory. This meets the goal of easy to add and hard to modify, but it is difficult to remotely verify that the "tamper-proof" memory has not been changed.

One method of implementing a log is to create a sequence of records where each record is made up of a message, $M_i$, and a rolling checksum, $r_i$. The rolling checksum is so named because it is computed from the current message and the previous checksum, and thus changes with each record. The rolling hash for the ith record can be computed as:

$$r_i = \text{hash}(r_{i-1} \cdot M_i)$$

where the message and the previous checksum are concatenated (represented by the ".") and provided to the hash function. The log in this case consists of a sequence of messages and checksums $(M_i, r_i)$. In one embodiment, an addition to the log may be made by taking the last checksum and the current message, concatenating the two, and computing the hash. This is shown in FIG. 1. Referring to FIG. 1, to create a new message and checksum pair, a message and checksum generator 101 receives a new message, $M_{i+3}$ and the checksum $r_{i+2}$ of the last entry in log 110. A concatenation module 102 concatenates the previous checksum $r_{i+2}$ with the message $M_{i+3}$. Hash module 103 applies a hash function, as described herein, to produce the next checksum $r_{i+3}$. Message $M_{i+3}$ and checksum $r_{i+3}$ are then stored in log 110. Note that message and checksum generator 101 may comprise a processing unit (e.g., a microprocessor) with concatenation module 102 and hash unit 103 being software modules of instructions that are executed by the processing unit. Alternatively, these functions could be implemented in hardware.

If one of the messages in the log is modified, or one of the checksums in the log is modified, then with high probability the subsequent checksum value recorded in the log will not correspond to the hash of the message and previous checksum. Thus modifying a record in a manner that cannot be detected would require changing the message and recomputing all subsequent checksums. If one of the checksums is copied and stored elsewhere, then any modification prior to that checksum can be detected. If a modification is made without updating the checksums, then recomputing the rolling checksums or hashes in the log reveals the error. If the rolling checksums are all changed so the log is self consistent, then the modified checksums won't match the previously externally saved checksums.

As set forth above, the hash function could be a simple checksum, but preferably is a cryptographic hash function.

This method of creating a log meets most of the goals for the log, but there are variations which provide additional benefits.

One modification is to store the hash of the message rather than the message itself in the log. Thus, if $m_i$ is defined as:

$$m_i = \mathrm{hash}(M_i),$$

then a log can be defined as a sequence of $(m_i, r_i)$, with $r_i$ being a checksum of only the message hash and the previous checksum:

$$r_i = \mathrm{hash}(r_{-1} m_i).$$

Figure 2:
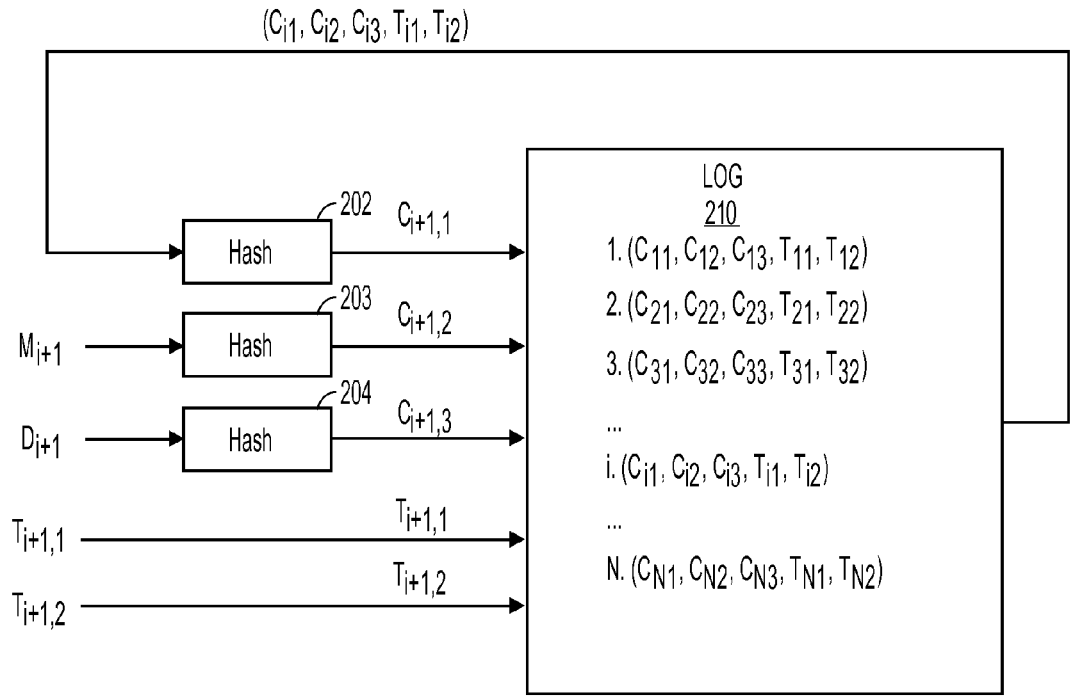
FIG. 2 illustrates generating and storing a hash of media in a log.

Another embodiment of a log is shown in FIG. 2. Referring to FIG. 2, to generate the i+1st log entry, the ith entry from log 210 is fed back to hash generator 202. Hash generator 202 utilizes a hash function to produce a Content Based Identifier, $C_{i+1,1}$ which becomes part of the new log entry. Several messages or message hashes may be added to the log at the same time. In FIG. 2 there are 4 messages shown, each of which could be a media file, metadata item, a CBI from another log, or string of bytes of any sort. Two of the messages, $M_{i+1}$ and $D_{i+1}$ are separately hashed by hash generators 203 and 204 to produce $C_{i+1,2}$ and $C_{i+1,3}$ which become part of the new log entry. Finally, messages $T_{i+1,1}$ and $T_{i+1,2}$ are stored directly in the log without hashing. A variable number of hashed messages and unhashed messages may be included. Some logs may not use any unhashed messages, or always use the same number of hashed and unhashed messages, or the unhashed messages may be of a fixed length or format to allow for easy parsing.

Storing the hash of a message rather than the message in the log has the advantage of producing fixed length records provided that the hash function has a fixed length, which is commonly true. This method has the further advantage of not having any message content in the log. Thus, if the message was some customer information (e.g., a purchase order with name, address, and order information), it would not be desirable to publish the message. However, if the hash used does not reveal information about the message, then the entire sequence of $(m_i, r_i)$ i.e. the log, can be published without revealing the sensitive customer information.

In some embodiments, more than one message $M_i$, $M_j$, $M_k$, etc. might be appended to the log as a single atomic transaction. A single hash function can be applied to the entire record with the message hashes arranged in a chosen order, producing the checksum $r_i$.

In one embodiment, the record and rolling checksum are structured slightly differently. In this case, each entry in the log is considered as a piece of media, and a cryptographic hash based identifier for the previous media is stored in the log along with the hash of the current message. Thus, a log consists of a sequence of $(p_i, m_i)$ where $m_i = \mathrm{hash}(M_i)$, and $p_i = \mathrm{hash}(p_{i-1}, m_{i-1})$.

In some cases, it is desirable to have a log with more information than solely the hash of the message. For example, it is often useful to have the time stored in the log or the type of information of the log entry stored in the published log. This makes it easier to search the log for specific records. Thus, then in one embodiment, if the information in a record that is readable is defined as the "plain text", called $t_i$, the log consists of a sequence of $(t_i, m_i, r_i)$, and each checksum, $r_i$, is computed as:

$$r_i = \mathrm{hash}(r_{i-1} \cdot t_i \cdot m_i)$$

This format is quite general because the $t_i$ portion could contain further structure (e.g., always a date and a type and a file name) while the messages could also be structured. Of course, the order of the previous rolling checksum, the current message or message hash, and "plain text" information can be changed, as long as the order is known to all applications needing to generate or verify a checksum.

Another way to provide partial access to information in a log is to encrypt some of the information stored in the log. Suppose the encrypted information for a log is $E_i$, and the hash of $E_i$ is $e_i$. In one embodiment, either $E_i$ or $e_i$ can be stored in the log. Thus, a log entry might consist of $(t_i, m_i, E_i, r_i)$, i.e. a plain text portion, a hash of the message, some encrypted data and a hash of the previous hash in the log and concatenated with the hash of the message. In general, there could be a mix of times and a record might have several plain text portions, several encrypted portions, and several hashes of messages.

In one embodiment, the format for log entries is a set of header "lines" and a body with data, e.g.

Author: gormish
SHA1: 1bff5d8cda307b5f3f3757cb25588a54cfb01ce0
Content-Length: 567
567 bytes of DATA In one embodiment, this type of format is used for http and email. Thus, several well-known headers have already been defined for those applications and could be used in a log.

Different keys can be used for different encrypted entries or different types of encrypted entries in the log. For example, all log entry publication information might be encrypted with one key, all classification values with a different key. If the log is associated with a single document and that document is encrypted, then the entries in the log might be encrypted with the same key as used for the document. That way, anyone with access to the document is also granted access to the information in the log.

Another method of implementing logs is through content based identifiers (CBIs). In one embodiment, a CBI is a sequence of bytes computed as a one way hash of a piece of media, representing a document, image, scanned piece of paper, etc. The CBI consists of two parts, a hash type used to compute the hash value and the hash value itself. In one embodiment, the hash type is defined by a five byte string indicating a hash type of md5, sha1, sha256, or Null, though other types of hashes may be utilized.

Log entries are made up of two or more CBIs, where the first CBI is either an initialization value or a reference to a previous log entry. The second and subsequent CBIs are content, such as other log entries, data, arbitrary strings of bytes, etc. An exemplary grammar for a log entry is:

```
entry = prev-ref 1*("-" content-ref)
prev-ref = cbi
content-ref = cbi
cbi = md5cbi | sha1cbi | sha256cbi | nullcbi
sha1cbi = "sha1." 40LOWHEX
md5cbi = "md5x." 32LOWHEX
sha256cbi = "s256." 64LOWHEX
nullcbi = "null."
LOWHEX = "a" | "b" | "c" | "d" | "e" | "f" | DIGIT
DIGIT    = <any US-ASCII digit "0".."9">
entry-line = "Entry:" SP entry CRLF
CRLF = CR LF
CR      = <US-ASCII CR, carriage return (13)>
LF      = <US-ASCII LF, linefeed (10)>
log-chain = *entry-line
```

An entry line is utilized to store CBI log entries in a text file, or other string based data structure, and a log chain is a sequence of log entries where every entry beyond the first contains the hash of the previous entry. Thus, in one embodiment, a sequence of syntactically correct log entries where any entry other than the last does not contain the correct hash of the previous log entry is an invalid log chain. One embodiment of verification of a log chain is described in greater detail below. An exemplary log chain is:

---

Entry: null-sha1.a72bfa0145c55eeb34400fa28489d3023dcb34e4
Entry: sha1.940f74e519e28fb9e5578291339251aea295fa2dsha1.a9993e364706816aba3e25717850c26c9cd0d89d
Entry: sha1.91f09dd09691e697cc5d9dba7515bc1a92177fa4sha1.84983e441c3bd26ebaae4aa1f95129e5e54670f1

---

The exemplary log chain file above includes three complete log entries.

While log entries may be stored in a file, in one embodiment, log entries are also stored as records in a database. For example, a shared document scanner is connected to a network, scanned documents are created as PDF files on the scanner, and distributed somewhere on the network, depending on user input. The scanner keeps track of where documents are initially distributed, and the date of capture and the cryptographic hash of the PDF file containing the scan. The scanner does not store the contents of all files (scans), but does store the hash of all files. In one embodiment, the scanner stores log chains with verification data about the scans in a database, such as an SQL database table. In another embodiment, the log chain provides verification information about the scans and the records in database tables. Although the example above discussed a scanner utilizing log chains, mail servers, multi-function printers, etc. may also be configured to create and log CBI entries.

In one embodiment, as discussed above, a log supports different multiple rolling hashes or different types of hashes, i.e. hashes computed with different cryptographic hash functions. For example, in one embodiment, the value $r_i$ is as follows:

$$r_i = \text{hash}(r_{i-1}, t_i, m_i)$$

and the value of $t_i$ specifies which hash function was used (e.g., MD5, SHA1, SHA256, etc.). In one embodiment, a log entry with two different rolling checksums has entries like:

$$(t_i, m_i, r_i, s_i)$$

where $r_i$ is computed as:

$$r_i = \text{SHA1}(r_{i-1}, t_i, m_i)$$

and $s_i$ is computed as:

$$s_i = \text{SHA256}(s_{i-1}, t_i, m_i)$$

As with the single rolling checksum case, the sequence of $r_i$, and $s_i$ can started by setting $r_0$ and $s_0$ to a preset initialization value, or to the hash of some media. This allows the same log to be used with systems that only support one type of hash, and if one hash function is broken, the other hash function may still be valid, and the combination of both is likely to be even harder to break. Other arrangements with logs using two or more hash functions would be apparent to those skilled in the art.

It should be noted that log entries can be added which retrospectively add new hash chains to a log. Suppose a log consists of pairs of messages and rolling hashes $(M_i, r_i)$, with $r_i = \text{SHA1}(r_{i-1}, M_i)$, with i between 1 and N. New messages can be added to the log which consists of the old messages and a new rolling hash computed with a different hash function. Thus, message N+1 could be the first message concatenated with a rolling checksum computed using a new hash function. In general:

$$M_{N+I} = M_i, s_i$$

where $$s_i = \text{SHA256}(s_{i-1}, M_i)$$

This allows the later repair of logs whose hash functions have been compromised, by adding a new hash covering the same material. Any number of hash functions can be applied retrospectively in this fashion, as hash functions are compromised and new functions are discovered.

In one embodiment, a second hash function makes use of the first hash function in its computation. For example, $$s_i = \text{SHA256}(s_{i-1}, t_i, m_i, r_i)$$

or $$s_i = \text{SHA256}(r_{i-1}, s_{i-1}, t_i, m_i)$$

Storage for a Log

In one embodiment, a log is stored sequentially in a single file. This sort of log is very easy to create because the rolling hash from the last entry is read, and new data is appended to the end of the file. If the entries are fixed length, it is easy to find a specific entry in the file. In many cases, a single file is sufficient especially if the log does not have too many entries.

In some cases, the log may become very long, usually because a record of a frequent event is being made. If a log is used to accumulate data from multiple sources, there could be several entries per second. In this case, it may be useful to break a log into multiple files, for example, after every 10,000 entries.

In another embodiment, each log entry is stored in a separate file. In this case, a pointer to the most recent entry is used for fast access. In one embodiment, the record has a sequence number inside it, and the most recent record can be determined by examining all record numbers. One technique is to name the file with the rolling hash, and include the rolling hash of the previous record in the file. In this way, it is possible to go from the most recent entry back through all the entries by following the pointer.

In another embodiment, each log entry is a record in a database. This is quite useful to enable rapid search for a particular message hash, rolling hash, range of times, plain text, or whatever the rest of the content of the log entry contains. A database implementation is useful when large numbers of entries are being made in the log because databases provide transactional integrity.

Write Once Memory

In addition to the computational methods of insuring that events occur in sequence, in one embodiment, a physical tamper proof device may be used to store a sequence of events. In one embodiment, the physical tamper proof device is a write once memory that stores the hashes of messages in order. Changing the entries in this sort of log would require changing the memory.

While write once memory is simple, it is hard to verify remotely that it hasn't been tampered with. Thus, in one embodiment, a tamper proof system provides digital signatures or other authentication techniques for its content.

Publishing Log Entries

Because it is relatively easy to modify a single log in a manner that is not detectable upon examination of that log in isolation, in one embodiment, information is exchanged between logs in such a way that modification of the entries in one log can be detected by examining another log. It is important to store information in the second log that depends on a range of log entries in the first log. For the logs defined previously, the rolling checksum has that property. Each checksum depends on the previous checksum and the other data in the log entry. Thus, if any part of a log entry is changed, the rolling checksum changes, and the rolling checksums after that point also change. Regardless of the computation function used for the "hash," if the messages or records contain more bits than the hash, there exist multiple messages or records that have the same hash. However, if the function used for the rolling checksums are well chosen, e.g. a cryptographic hash function, it is extremely difficult to find these messages.

There are several ways to store information from one log in another log. This process is called publishing or entangling because after storing information from one log in another, all future rolling checksums in the second log depend on the information in the first log.

In one embodiment, one log is being used to store pairs of message hashes and rolling hashes, i.e. $(m_i, r_i)$, and the rolling hash from the first log is used as the message hash for an entry in a second log. Thus, all rolling hashes after that entry in the second log depend on the rolling hash from the first log.

While this is the simplest embodiment, the limited amount of information stored when publishing can make it difficult to determine what the nature of the hash is. Thus, in one embodiment, additional information is included in the log entry used for publication. For example, those logs using a type value can set the type to indicate that the data is not a "regular message" but an "external checksum." Further, instead of using a rolling checksum directly in place of the message hash, a message can be formed which contains the rolling hash from the first log and the location of the first log (e.g., a server name, a log name, a file name, URL, etc.). In one embodiment, the location of the rolling hash in the first log is included (e.g. a sequence number, date, etc.). This embodiment allows a log to be followed backwards and allows determination of the other logs on which the current log depends.

Figure 3:
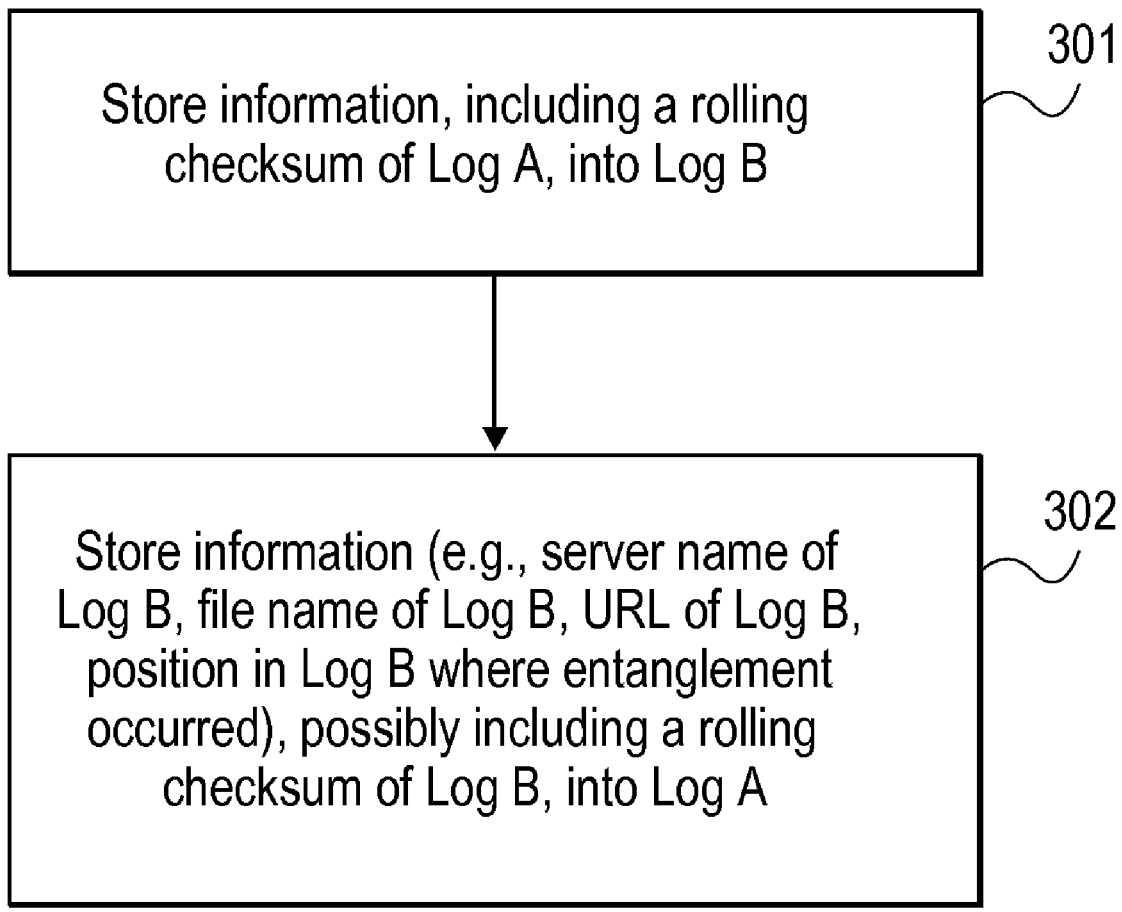
FIG. 3 is a flow diagram of one embodiment of a process for entangling a pair of logs.

In many cases, it is desirable to determine which logs contain information from a first log. In order to facilitate this, information can be stored in both logs when checksums are published. FIG. 3 is a flow diagram of one embodiment of a process for publishing or entangling a pair of logs. The process is performed by processing logic that may comprise hardware (circuitry, dedicated logic, etc.), software (such as is run on a general purpose computer system or a dedicated machine), or a combination of both.

Referring to FIG. 3, the process begins by processing logic storing information, including the current rolling checksum of log A into a log entry in log B (processing block 301).

Next, processing logic stores information about log B in log A (processing block 302). In one embodiment, the information stored in log A about log B may include the server name, file name, or URL of log B and the position in the log where the entanglement is stored. In one embodiment, the information stored in log A may also include a rolling checksum from log B. If this checksum is stored in the log, the publication is both from log B to log A and from log A to log B.

Verification Procedure

In many situations, it is necessary to determine if a log has been modified since it was created. This is best done by software, computer systems, and people independent from the log generation hardware, software, and people.

Figure 11:
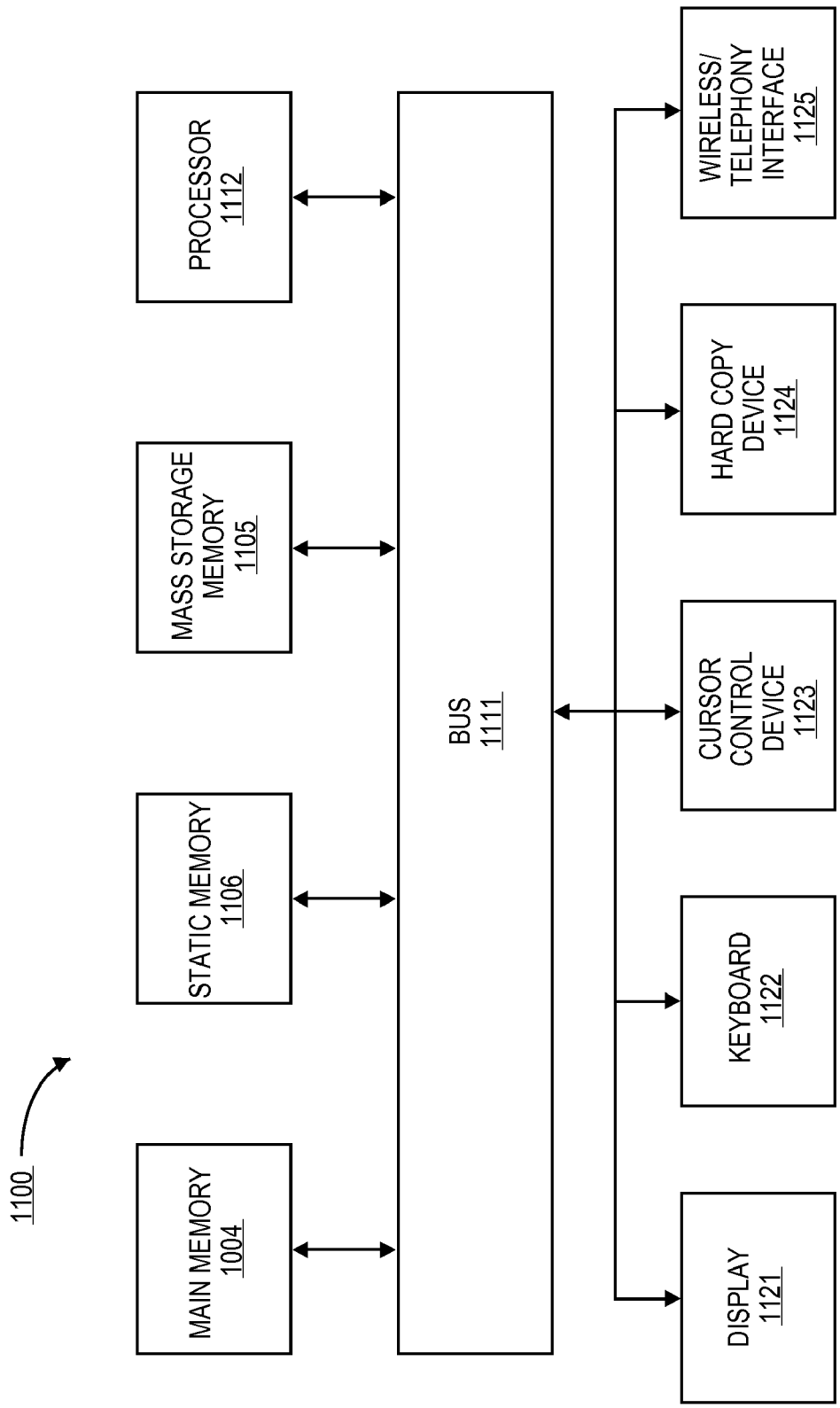
FIG. 11 is a block diagram of a computer system that may perform one or more of the operations described herein.

In one embodiment, to determine if a log is self consistent, verification software such as in a computer system of FIG. 11 or a dedicated machine recomputes the rolling hash for each entry in the log. If the rolling hash computed by the verification software matches the rolling hash stored in the log, then the entry associated with the rolling hash has not been changed unless the hash function has been compromised. For purposes herein, the hash function "being compromised" means two distinct sequences of bytes have been found that yield the same hash.

To determine if entries in a log are consistent across multiple logs, the entries must be consistent from the message of interest up to and including a rolling checksum that is published in or entangled with another log. The entries in the second log must be self consistent before and after the published entry. If Log A has entries which are published to Log B, Log A and Log B may be referred to as being entangled.

An Example of a Hash Chain Detection Procedure

Figure 4:
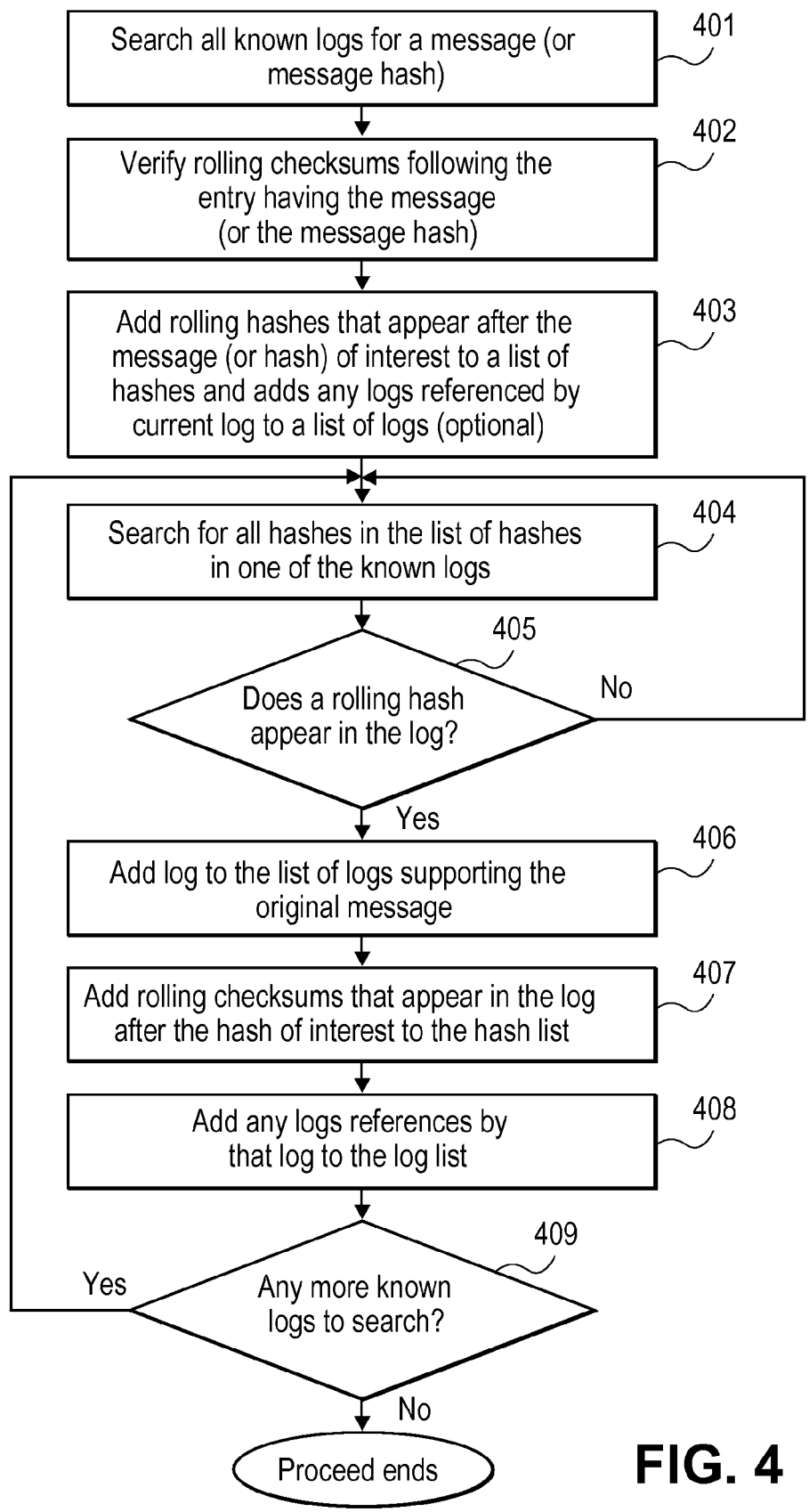
FIG. 4 is a flow diagram of one embodiment of a process for performing entanglement detection.

If a third party wishes to determine the validity of a message stored in a log some time after the entry was made and rolling checksums were published to other logs, hash chain detection allows all servers which have entries that are consistent with the message to be determined. FIG. 4 is a flow diagram of one embodiment of a process for performing entry verification. The process is performed by processing logic that may comprise hardware (circuitry, dedicated logic, etc.), software (such as is run on a general purpose computer system or a dedicated machine), or a combination of both.

Referring to FIG. 4, the process begins by processing logic initializing a list of servers that have evidence to the empty set, initializing the list of messages or hashes of interest to the single message or hash desired and searching for the message or message hash of interest on all known logs (processing block 401). If the message or its hash is not found anywhere, no verification is possible and the process ends.

If a message or hash of interest is found, then the processing logic verifies the rolling checksums following the entry containing the message or hash, for every log where the message or message hash is found (processing block 402). In one embodiment, this is done by recomputing the checksums $r_i$ for the log using the verification software.

Processing logic adds all rolling hashes that appear after the hash of interest to a list of hashes, and adds any logs referenced by the current log to a list of logs of interest (processing block 403). Some logs will not list other logs, in which case there is nothing to perform for this sub-step.

Processing logic searches for all hashes in the hashes of interest list in one of the known logs that has not been searched (processing block 404). Afterwards, processing logic tests whether a rolling hash appears in the log (processing block 405). If not, the process transitions to processing block 404 where the process continues. If a rolling hash appears in a log, processing logic adds that log to the list of logs with evidence about the original message or hash (processing block 406), and adds all rolling checksums that appear in the log after the hash of interest to the hash list (processing block 407) and adds any logs referenced by that log to the log list (processing block 408).

Processing logic then checks whether there are any more known logs to search (processing block 409). If not, the process ends. If so, processing transitions to processing block 404 and repeats the process until no new hashes are added to the list of hashes of interest, and no new logs are added to the list logs.

In general, many logs may be stored on the same device, same office, or same company. However, if a log is entangled with logs on multiple physical devices, or with logs which are under the control of different companies, then confidence in verification of the logs will be increased, because some of the logs used for verification are outside the control of the initial entity. This benefit of publishing to different devices means that the logs should be able to store addresses of entangled logs that cross company and device boundaries. One way to do this is to use a URL to identify a log.

In general, the technique described above to verify logs can involve a lot of operations. However, the complexity can be reduced by keeping better track of hashes and logs that have been previously searched. Complexity can also be reduced by only considering log entries occurring before a certain time, or searching certain logs first, for example if it is known that certain logs are used for entangling more often these can be searched earlier. Other search procedures can be used, for example, starting the search with a trusted server and looking for entries that have been published to that server.

Authentication via Logs

The rolling checksum in a log can be used as part of an authentication mechanism. For example, knowledge of the most recent rolling checksum $r_N$ could be used as permission to write an additional entry to a log. A device keeping a log could insist that the most recent checksum be provided with the new log entry. By doing so, if two other devices know the current checksum, and both request to write to the log, only one will succeed. The first device to provide a new log entry will cause the checksum to change, and then the second device will not have the correct checksum. This technique provides a way to insure that new data is added to the log only if the provider of the data has the most up-to-date information about the log. Thus, the checksum can be used as a form of "lock" on the log to prevent race conditions.

The above discusses using the rolling checksum to control access to the log, but the rolling checksum can also be used to prove that the same log is being used again. In this case, the full contents of the log should not be publicly available. Someone could make a first interaction with a system using a log, and store a message in that log, and provide the rolling hash to the system. In a subsequent interaction, the system could ask for the rolling hash used to make the deposit. If more security is desired, in one embodiment, the system asks for information about that rolling hash (e.g., the hash of that rolling hash and a challenge string). The system could ask for several pieces of information about a previous interaction that could only be answered by someone in possession of the log.

In one embodiment, the term 'rolling checksum' is used herein to mean a string of bytes computed by a function, such as a cryptographic hash, on previous portions of a log. The portions of the log used in the computation vary from application to application. In one embodiment, a Content Based Identifier, or CBI, is used in the same way when the CBI is computed for a portion of a log, or computed for media (e.g., a digital photograph) that is not part of a log. In one embodiment, a hash chain is used to refer to a sequence of entries where each entry contains a rolling checksum, and all of the data in the hash chain before the final rolling checksum is part of at least one of the rolling checksums.

In one embodiment, verifying a rolling check sum or CBI includes operating the function used for the rolling checksum or CBI on the appropriate data, and comparing the computed result with the stored value. If the computed value and the stored value are the same, the rolling checksum is valid, consistent, verified, etc. In one embodiment, verifying a hash chain is used to mean verifying a sequence of rolling checksums or CBIs in the hash chain and comparing the computed results with the values stored in the hash chain. In one embodiment, a hash chain, where all of these computations produce results equivalent to the values stored in the hash chain, is said to be consistent. A consistent hash chain where the final entry is stored by a trusted entity is said to be verified. Furthermore, a hash chain where even one computation fails to produce the value stored in the hash chain is said to fail verification, be inconsistent, or be invalid.

In one embodiment, a hash chain begins with an item of media, and then a sequence of log entries. In this case, the CBI for the media must be in the first entry in the hash chain. Thus, verification includes computing the CBI for the media and comparing the computed value with the value in the first entry. In one embodiment, an item of media is verified by having a hash chain beginning with the media and ending at a log entry from a trusted entity. A properly formed log is a hash chain. In one embodiment, a log is a local collection of log entries with each rolling checksum in the same position in the entry.

In one embodiment, hash chains may be created from log entries stored in multiple locations and part of multiple logs. Logs may be created for a variety of reasons. In one embodiment, when a log contains information associated with a particular media, it may be referred to as a document log. In one embodiment, when a log is associated with a process, server, or collection of media, it may be referred to as a device log. The terms device log and document log may be used to imply typical usage, but do not limit the application to only one type of information.

Automatically Publishing CBIs in Electronic Communications

In one embodiment, a web of trust is created by automatically publishing content based identifiers (CBIs) to entangle hashed chained log entries with other logs, as well as data archives, of other systems. In one embodiment, the CBIs are published when, for example, an email is sent to a receiving system, a blog entry is uploaded to a server, an instant message is sent from one user to another, etc. Then, at some time later, the CBI may be recalled from the electronic communication to validate log entries for a log from which the CBI was taken. As discussed in greater detail below, CBIs are distributed between systems though electronic communications, without the communications modifying the CBIs. Thus, when a log is to be verified from a CBI, a CBI may be extracted from one or more of the communications, which is potentially stored at multiple independent sources.

The automatic publication of a CBI from a document log, transaction log, or other information-based log used for business processes is a side effect of electronic message delivery (e.g. delivery of the email, instant message, blog entry, etc.). In one embodiment, a CBI for automatic publication is a CBI of individual documents, or data, used in a business process (e.g., a travel authorization, a customer approval, etc.). Furthermore, as discussed herein, the automatic publication of CBIs enables webs of trust to include systems that have not adopted CBI logging techniques. Rather, by storing an electronic communication that includes a CBI, the system automatically is part of a web of trust, and stores data (e.g., the electronic communication with the CBI) that may later be used to validate log entries. In one embodiment, the properties of hash chained logs may be utilized to verify the authenticity of digital data and establish order of events involving digital workflows from the CBIs in a web of trust.

Figure 5:
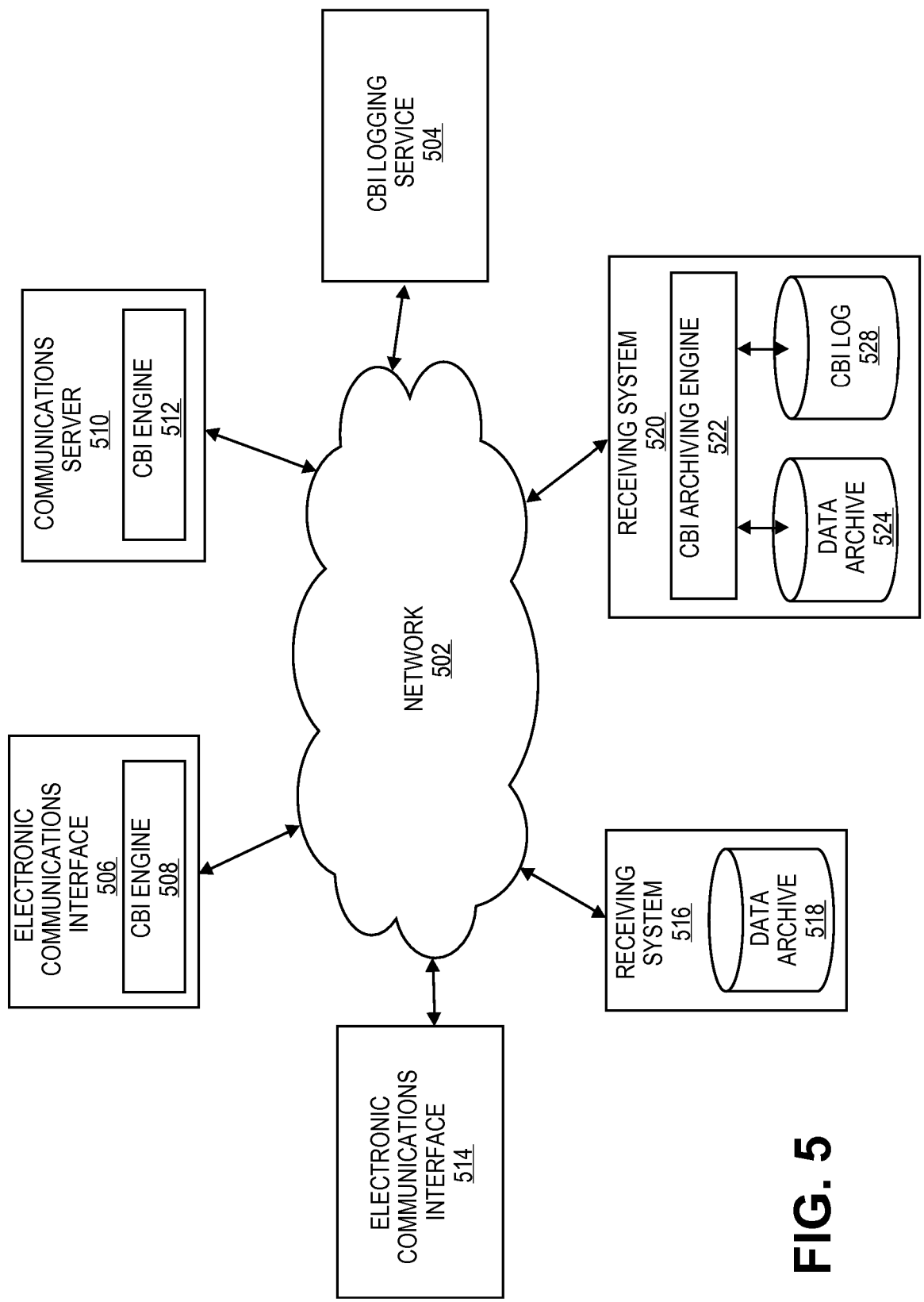
FIG. 5 illustrates one embodiment of a system for automatically publishing content based identifiers.

FIG. 5 illustrates one embodiment of a system for automatically publishing content based identifiers. Electronic communications interfaces 506 and 514 are coupled to a communications server 510 and CBI logging service 504 via network 502. For one embodiment, network 502 is an insecure network (e.g., the Internet), a local network, private network, a wide area network, or a combination of networks In one embodiment, the electronic communication interfaces may be, for example, an email client, a blog creation client, an instant message client, a voice over internet protocol telephone, etc., In one embodiment, electronic communications interface 514 transmits an electronic communication to one of receiving system 516 or receiving system 520 via communication server 510. In one embodiment, electronic communications interface is an unmodified communications interface, such as a standard email client, blog creation tool, etc. In another embodiment, electronic communications interface is a web application that is accessed via a standard web browser.

In one embodiment, communication server 510 may be an outgoing mail server (e.g. a Simple Mail Transfer Protocol server), an instant messaging server, a voice over internet protocol server (VOIP), etc. When communication server 510 receives the electronic communication, for delivery to a receiving system, CBI engine 512 obtains a CBI from CBI logging service 504 for inclusion in the electronic communication. In one embodiment, CBI logging service 504 creates hash chained log entries for communications, business process data, transactions, etc., and maintains corresponding hash-chained logs of the entries, as discussed above. Thus, the CBI obtained from CBI logging service may be the latest entry in a rolling hash-chained log, a CBI computed from the electronic communication and a hash-chained log entry, etc. Communications server 510 then delivers the electronic communication to the appropriate recipient, such as receiving system 516 or receiving system 520.

In one embodiment, electronic communication interface 506 transmits an electronic communication to a receiving system, but inserts a CBI into the electronic communication via a local CBI engine 508. CBI engine 508 of electronic communications interface 506 therefore obtains a CBI from CBI logging service 504 for each communication to be transmitted to a recipient. In one embodiment, communication interface 506 is a specially configured client for email, instant messaging, VOIP, syndication, etc. In one embodiment, electronic communication interface 506 is a specially configured peer for instant messaging, VOIP, etc.

In one embodiment, when receiving system 516 receives an electronic communication, receiving system 516 stores the electronic communication in data archive 518. In one embodiment, storage of the electronic communication may be required by law. For example, financial services companies in the United States are required to retain all client communications to comply with U.S. Securities and Exchange Commission regulations. Businesses may be required to retain certain electronic communications to comply with U.S. Sarbanes-Oxley (SOX) regulations. Other laws and internal data retention policies may also cause businesses to store electronic communications. Furthermore, electronic communication such as voice over internet protocol (VOIP), broadcast messaging systems such as the TWITTER™ service, etc. may also be archived.

In one embodiment, when receiving system 520 receives an electronic communication, receiving system 520 stores the electronic communication in data archive 524, as required by law, business practice, etc. However, CBI archiving engine 522 analyzes each received communication prior to storage in data archive 524. In one embodiment, CBI archiving engine 522 searches each electronic communication for a CBI. When a CBI is found by CBI archiving engine 522, the CBI is extracted from the electronic communication and is stored in CBI log 528. In one embodiment, data regarding each received CBI, such as the CBI itself, when it was received, what electronic communication it corresponds to, a data reference (e.g., a universal resource locator) that identifies a log, etc. is catalogued in CBI log 528. In one embodiment, CBI archiving engine 522 may also add the extracted CBI to a hash-chained log (not shown) at receiving system 522.

Figure 6:
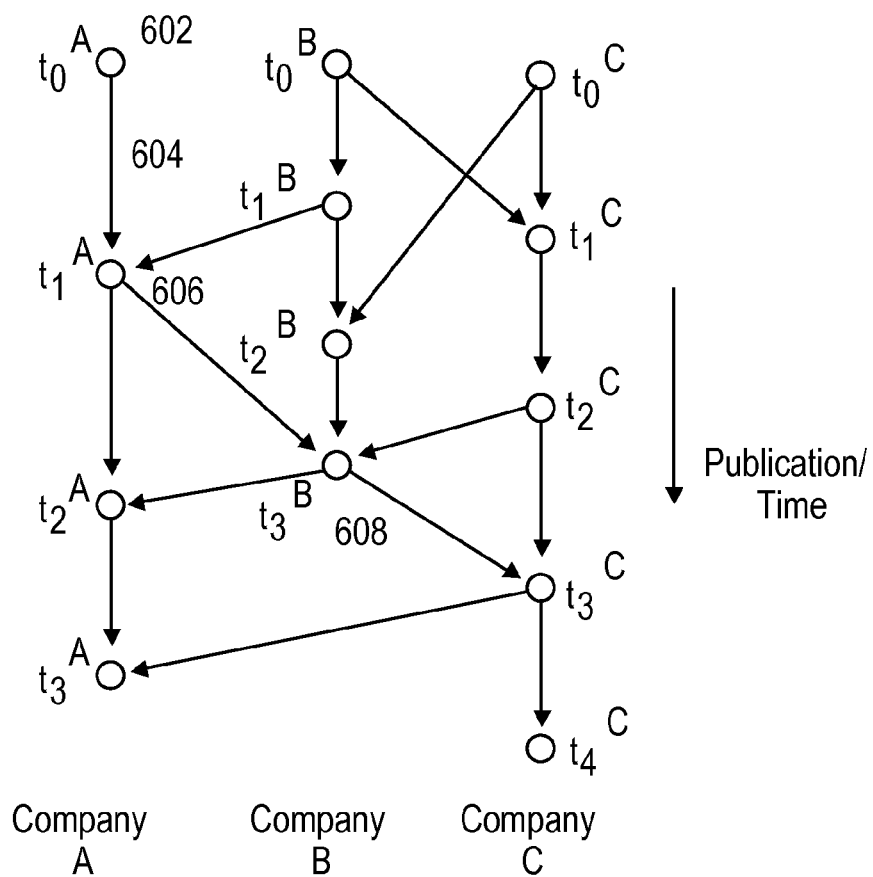
FIG. 6 illustrates one embodiment of a content based identifier web of trust.

FIG. 6 illustrates one embodiment of a content based identifier web of trust. The circles in FIG. 6, e.g. circle 602, represent log entries containing two or more CBIs. These log entries may be stored as individual files, as parts of a log file, or as parts of a larger structure, like an email message. The arrows in FIG. 6, e.g. arrow 604, represent publication of the CBI of one entry to another entry, i.e. the CBI of entry 602 is included in entry 606. Each vertical column in FIG. 6 is a set of entries controlled by a single entity. In FIG. 6, these are called Company A, Company B, and Company C. Publication from Company A to Company B may happen by any protocol, including email. Once Company B receives a CBI and stores it, there is evidence in Company B for all of the entries with paths leading to the stored entry. For example, if Company B, stores entry 608, Company B has evidence for entries 606 and 602 stored at Company A, because the arrows can be followed from those entries to entry 608. If company B publishes entry 608 to Company C, and Company C stores this in entry 610, Company C has evidence of entries 602, 606, and 608, and many other entries in FIG. 6. In this way, there is a web trust because multiple companies have evidence of entries in other companies. Furthermore, the companies do not necessarily know the content of the other entries.

FIG. 6 also illustrates the times that different companies will assign to entries and the associated document. Company A will assign time $t_0^A$ to entry 602, i.e. the time Company A created the entry. Company B, will assign the time $t_3B$ to its own entry 608 and to company A's 602 and 606 entries. Company B does not have proof that entry 602 happened at $t_0^A$, but as long as Company B's system has not been compromised, it knows that entry 602 and 604 happened before $t_3^B$. Likewise Company C will assign time $t_3^C$ to all of these events. In this way multiple companies have a time and date associated with entries at other companies. Although times will not be the same, with frequent publication, each company will be able to agree on the same date of publication for an entry.

Figure 7:
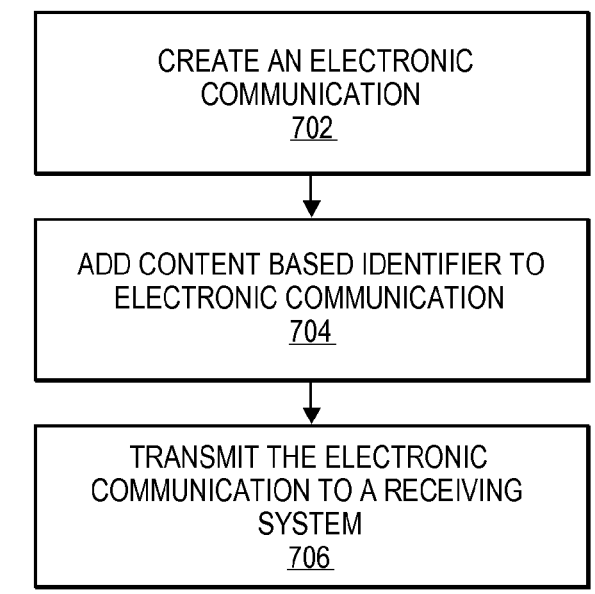
FIG. 7 is a flow diagram of one embodiment of a process for automatically publishing a content based identifier.

FIG. 7 is a flow diagram of one embodiment of a process for automatically publishing a content based identifier. The process is performed by processing logic that may comprise hardware (circuitry, dedicated logic, etc.), software (such as is run on a general purpose computer system or a dedicated machine), or a combination of both.

Referring to FIG. 7, the process begins by processing logic creating an electronic communication (processing block 702) and adding a content based identifier to an electronic communication (processing block 704). As discussed in the embodiments below, the electronic communication may be an email message, a blog entry, a TWITTER™ message, a syndication message (e.g., ATOM or RSS), a VOIP message, etc. In one embodiment, the CBI is a hash value for a log entry from a log of rolling hash values. In one embodiment, the CBI is added to a location of the electronic communication, such as a header, that will not be modified by processing logic.

In one embodiment, a CBI is a globally unique identifier, and thus no identification information other than the CBI is added to the electronic communication. In one embodiment, the CBI can be used in places like a Message-ID header of an email message, and include a globally unique ID. When a globally unique ID is used, the CBI becomes an essential part of the message. In another embodiment, additional data is added to the electronic communication to identify, for example, the system sending the communication, the log, data indicating that the communication is a CBI-based publication, etc.

Processing logic then transmits the electronic communication to a receiving system (processing block 706). In one embodiment, the header where the CBI was added is a header that will not be modified if the receiving system forwards, responds to, or otherwise distributes the electronic communication at a later time.

Publication Using Email

In one embodiment, email may be utilized for automatic publication of content based identifiers. For an individual publication, an email can be created and sent as discussed above. In one embodiment, a header of the email includes a CBI, which may be inserted into the header at an outgoing mail server or by the email client system. In one embodiment, the email's header both identifies a log and allows the log to be validated/authenticated. As discussed in greater detail above, the properties of hash values and a log of rolling hash values enables the verification of specific log entries and/or an entire hash-chained log from a CBI.

Many businesses retain email. Some businesses have data retention policies that require retaining email for a specified length of time, while other businesses are permanently required to retain emails due to government regulation, for example, to comply with the SOX regulations. Each email can have any content, and one or a small number of headers are utilized for storage of a CBI and/or CBI related data. In one embodiment, the headers are chosen so that they are ignored by email clients, and thus will not be modified by the email client upon receipt, reply, or forwarding of an email. In one embodiment, for example, X-NEWR-Publication: is inserted into a header when a CBI is included in the header. As a result, receiving systems configured to search for CBIs may easily detect and extract CBIs from received emails. Furthermore, if requests are received to recall electronic communication with a CBI, the inclusion of X-NEWR-Publication: in the header enables the search and discovery of the needed information more efficiently.

In one embodiment, the Message-ID header of an email is utilized to store CBIs. When an email client replies to an email with a CBI in the Message-ID header, the CBI will be contained in one or more headers, such as In-Reply-To headers, in the reply message. Furthermore, the CBI will not be modified when the email is forwarded. The reply therefore acts as a second publication, which serves as an acknowledgement of the first publication or as a publication to other email recipients. In one embodiment, headers with CBIs may be created by an email client or an SMTP server (e.g., sendmail, postfix, Microsoft Exchange servers).

In one embodiment, CBIs are placed in the body of an email message, such as in a signature line at the end of the message as a type of digital signature. Note that, as discussed above, a CBI can be the latest rolling hash in a hash chain. It can also be the CBI of a document or some information from a business processes. Since publishing the CBI is a side effect of the communication, the CBI will typically be unrelated to the rest of the communication.

An example of a Message-ID header that contains a CBI, in one embodiment, is:

```
Message-ID:
  <sha1.03f3b6cc6cc61f1bb21f23436d601d6d70fc352e@azul.
  crc.ricoh.com>
```

In one embodiment, when an email client replies to an email, it uses the value of the original email's Message-ID header in an In-Reply-To and/or References headers. Reply emails, in one embodiment, become a type of confirmation that a CBI was received. Below are examples from various email clients.

```
X-Mailer: Microsoft Office Outlook 11
X-MimeOLE: Produced By Microsoft MimeOLE V6.00.2900.3198
In-Reply-To:
  <sha1.03f3b6cc6cc61f1bb21f23436d601d6d70fc352e@azul.
  crc.ricoh.com>
X-Mailer: Apple Mail (2.915)
References:
  <sha1.03f3b6cc6cc61f1bb21f23436d601d6d70fc352e@azul.
  crc.ricoh.com>
In-Reply-To:
  <sha1.03f3b6cc6cc61f1bb21f23436d601d6d70fc352e@azul.
  crc.ricoh.com>
User-Agent: Thunderbird 2.0.0.9 (Macintosh/20071031)
References:
  <sha1.03f3b6cc6cc61f1bb21f23436d601d6d70fc352e@azul.
  crc.ricoh.com>
In-Reply-To:
  <sha1.03f3b6cc6cc61f1bb21f23436d601d6d70fc352e@azul.
  crc.ricoh.com>
```

In one embodiment, the CBI logging service 504 may be a Shared Record Server (Shared Records Organization, UnaMessa Association, 2882 Sand Hill Rd. #118, Menlo Park, Calif. 94025, USA). In one embodiment, the data added to the electronic communication includes not just the rolling hash, but includes information that identifies a Shared Records log and provides uniqueness. In one embodiment, the headers of an email are modified to include a URL for a log, the name of the log entry (e.g., a Metadata Entry), a Shared Records Server timestamp, and a random number. These headers are hashed to create a unique Message-ID. An example is below:

```
X-sharedrecords-log:
  wort3.crc.ricoh.com:8080/SRCDataStore/RESTServlet/?prefix=
  4704926776112a8dcfb34f3039dc614d02fdd623/log/&format=xml
X-sharedrecords-timestamp: Thu, 31 Jan 2008 21:46:47 GMT
X-sharedrecords-entry:
  NamespaceRecentMetadata_0000000353_198b6df8495ebcf34-
  a99d0c52d205f8dcae38ff6
X-sharedrecords-random: 0.237491588
Message-ID:
  <sha1.03f3b6cc6cc61f1bb21f23436d601d6d70fc352e@azul.
  crc.ricoh.com>
```

In one embodiment, the log entry used is the last entry in the log. In another embodiment, the log entry used is the second to last entry in the log. Log entries more than eight hours old are not used and new log entries are created instead. In one embodiment, the email client used to send an email is the emacs RMAIL client with an extension. In one embodiment, the extension is implemented in Pymacs (Python integration for emacs), and is presented below.

Example Source Code for Automatic Publication By Email

Excerpts from one embodiment of a software implementation for automatic publication of CBIs by email is provided below. The source code provided below is one embodiment of CBI engine 508 in FIG. 5. In one embodiment, an electronic communications interface, such as Electronic Communications Interface 506 in FIG. 5, which uses this CBI engine, is an RMAIL email client from emacs (GNU Organization, 51

Franklin St, Fifth Floor, Boston, Mass. 02110, USA) and is used with Pymacs Python integration. In one embodiment, a CBI engine, such as CBI Engine 508 of FIG. 5, is called by an appropriate emacs "hook" before each email is sent. In the source code, "nr.email_headers" returns headers form a Shared Records based CBI logging service, such as CBI Logging Service 506 discussed in FIG. 5. Note that these details are omitted from the source code example below, since they are not relevant to implementations with other email clients.

```
import sys
import socket
sys.path.append('/home/schwartz/Work/Svn/shared_records_demo/
  VPserver')
sys.path.append('/home/schwartz/Work/Svn/shared_records_demo/
  VPserver/PyRecords')
import VPNamespaceBase
import PyRecords
emacs_flag = True
if _name_ == '_main_':
    emacs_flag = False
    print 'This file is intended to be used inlcuded by els_mail.py'
    print special_msg_id([ ])
if emacs_flag:
    from Pymacs import lisp, Let
def addresses_not_ok(addresses):
    # check for Ricoh addresses only?
    for addr in addresses:
        a = addr.split('@')
        if len(a) == 2:
            if not a[1].endswith('ricoh.com'):
                return addr
    return False
def special_msg_id(addresses):
    rval = addresses_not_ok(addresses)
    if rval:
        print 'No special msg-id due to address %s' % rval
        return
    domain = socket.gethostname( )
    pr = PyRecords.PyRecords(secure=False, timeout=3.0)
    nr = VPNamespaceBase.NamespaceRecord('demo1')
    try:
        headers = nr.email_headers(pr, domain)
    except socket.error, ex:
        print 'Socket Error', str(ex)
        return
    if headers:
        if not emacs_flag:
            return headers
        let1 = Let( ).push_excursion( )
        lisp.mail_reply_to( ) # move point to end of Reply-To
        lisp.forward_line( )
        lisp.insert(str(headers))
        del let1
        print headers
```

Below is an example of a "new" log entry created when the previous entry was more than eight hours old. The Base64 encoded data is the date as a string, Tue Feb 12 01:27:11 2008:

```
<MetaDataEntry>
<RecordUID>4704926776112a8dcfb34f3039dc614d02fdd623</
  RecordUID>
<Title>NamespaceRecentMetadata</Title>
<UserID/>
<ContentType/>
<PreviousEntryFileName>Virtual Private Namespace
  Entry_0000000363_9bf911f9e292d168d11159ff2dd9ed24a5f6c19f</
  PreviousEntryFileName>
<Tags/>
<TimeStamp>2008-02-12T18:31:56.522UTC</TimeStamp>
<UserTimeStamp>2008-02-12T18:31:56.522UTC</UserTimeStamp>
```

-continued

```
<SequenceNumber>364</SequenceNumber>
<Signature/><Data>VHVlIEZlYiAxMiAwMToyNzoxMSAyMDA4</
  Data>
</MetaDataEntry>
```

In one embodiment, Microsoft Visual Basic for Applications (VBA) may be utilized to work with Outlook as the email client.

In one embodiment, publication is performed without a specially configured email client or email server. In one embodiment, a web interface (for use with a web browser) may start publication via email. In one embodiment, the web interface is utilized to send email messages, which include CBIs. The resulting email messages may then be replied to, or forwarded, for further distribution of the CBIs.

In one embodiment, a web service, such as CBI Logging Service 504 of FIG. 5, provides email headers as discussed above. In one embodiment, the web interface application creates a log entry where the CBI was used in a Message-ID header, and the log entry is considered as a reservation for an email. When the email containing the Message-ID header is sent, it is logged so that it can be matched with its reservation log entry (e.g. either in the same log or by entangling separate logs). In one embodiment, reservation log entries that do not have a corresponding email can be investigated.

Headers or messages can contain previous CBIs in order, or as fragments of a log chain. In one embodiment, previous CBIs can be a subset of all previous CBIs in a log, or previous documents, such as the $B^i$-th previous documents for B=2 or B=4 and i=1 . . . 10. In one embodiment, the previous CBIs may be a number of randomly picked previous CBIs. Thus, multiple messages that have fragments of a log chain that partially over lap can be assembled into longer log chains.

Publication Using Session Initiation Protocol (SIP)

Session Initiation Protocol (SIP), RFC 3261, is a signaling protocol used for internet voice and video calls, and other communication. SIP uses the same basic format as email (Internet Message Format, RFC2822). In one embodiment, CBIs are inserted into headers of SIP based communications as described above for email. Although the Message-ID header has no special meaning in RFC-3261, the Call-ID header is utilized for publication of CBIs in voice communications.

Publication Using Extensible Messaging and Presence Protocol (XMPP)

The Extensible Messaging and Presence Protocol (XMPP Standards Foundation, P.O. Box 1641, Denver, Colo. 80201-1641) is an instant messaging protocol used by GOOGLE™ (GOOGLE TALK™), LIVEJOURNAL™ (LJTALK™), APPLE™ (ICHAT™), and others. XMPP communications utilize extensible markup language (XML) in the protocol. In one embodiment, a CBI can be included in any location that is syntactically valid and ignored or treated as opaque by XMPP software such as bodies of messages, XML comments, and certain XML elements and attributes. In one embodiment, the id attribute defined in the XMPP Core specification, RFC 3920, may contain a CBI provided by an XMPP server. Since this is used as session key, the id is unique. In one embodiment, the <thread/> element in the XMPP Instant Messaging or Presence specification utilized. RFC 3921 may similarly contain a CBI and is unique. In one embodiment, CBIs may be used in authorization tokens as specified in XMPP (Authorization Tokens, XEP-0235). Furthermore, CBIs may be used in hidden form fields as specified in Data Forms, XEP-0004.

Publication Using Syndication Protocols

RSS (http://www.rssboard.org/rss-specification) and Atom (RFC4287) syndication formats are widely used for blogs. In one embodiment, CBIs are included in the bodies of (blog) items. These formats use XML, so they can include CBI in any location that is syntactically valid and ignored, or treated as opaque by readers of the format. In one embodiment, CBIs may be used in permalinks. In one embodiment, for RSS 2.0, a CBI may be used in the guide element. In one embodiment, for Atom, a CBI may be used in the id element.

Publication Using TWITTER™

In one embodiment, the TWITTER™ web service is used to send electronic communications that contain CBIs to devices that archive messages or that maintain a log, as discussed herein. In one embodiment, writing a CBI in a TWITTER™ electronic communication is a convenient way to write a CBI to a remote log. TWITTER™ messages are limited (by the specifications of the TWITTER™ service) to 140 bytes in length. Because these messages are short, in one embodiment, a message that contains a CBI contains little other information.

Archiving Content Based Identifiers

Figure 8:
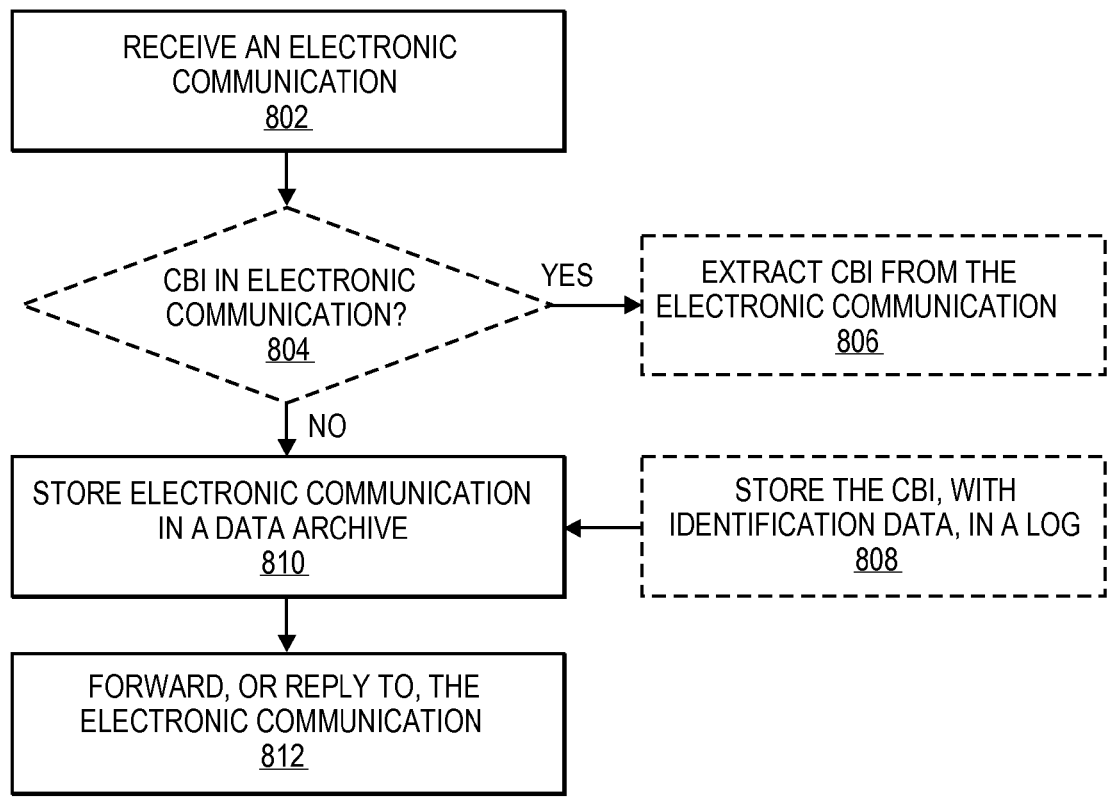
FIG. 8 is a flow diagram of one embodiment of a process for archiving a content based identifier in an electronic communication.

FIG. 8 is a flow diagram of one embodiment of a process for archiving a content based identifier in an electronic communication. The process is performed by processing logic that may comprise hardware (circuitry, dedicated logic, etc.), software (such as is run on a general purpose computer system or a dedicated machine), or a combination of both.

Referring to FIG. 8, the process begins by processing logic receiving an electronic communication (processing block 802). Processing logic determines if there is a CBI in the electronic communication (processing block 804). In one embodiment, the received electronic communication is a communication originated from a sending system. In another embodiment, the electronic communication is a reply communication (e.g., a response to an email, a VOIP message return, etc.). In the case of a reply communication, the CBI in the reply is an acknowledgement that a CBI was received by a receiving system, such as the receiving systems discussed above with respect to FIGS. 5 and 7.

In one embodiment, processing logic may be configured to search for CBIs in an electronic communication (e.g., such as processing logic in receiving system 520 of FIG. 5). Processing blocks 804-808 are illustrated in dashed line to show processing blocks utilized when processing logic is configured to detect CBIs in received communications. However, as discussed herein, automatically publishing CBIs in electronic communications does not require receiving systems to be aware of the CBIs. Rather, CBIs may be published, such as by an email message, reply message, forwarded message, etc. and saved by a receiving system. Thus, for those receiving systems that are not configured to search for CBIs, but instead accept and store electronic communications, processing blocks 804-808 may be omitted.

When there is a CBI in the electronic communication, processing logic extracts the CBI from the electronic communication (processing block 806) and stores the CBI, with accompanying data, in a log (processing block 808). In one embodiment, processing logic searches for CBIs, hashes, and other identifiers in electronic communications so that the data can be added to one or more logs. In one embodiment, the accompanying data may be, for example, data indicating a log from which the CBI is from, a timestamp corresponding to the CBI, a URL reference to a log from which the CBI was obtained, data indicating that a particular electronic communication where a CBI was received by a receiving system, as well as other metadata.

The electronic communication is then stored in a data archive (processing block 810). In one embodiment, storage of certain electronic communications may be required by law (e.g., emails in a U.S. business email systems, instant messages in financial trading systems, etc.). Furthermore, other services may store electronic communication as part of the service (e.g., TWITTER™ messages, blogs, online archiving services like GMAIL™, etc.).

In one embodiment, processing logic then forwards or replies to the electronic communication (processing block 812). Since CBIs are included in headers of an electronic communication, as well as other locations that are ignored when the messages are processed, forwarding and replying to stored messages (that include a CBI) enables the creation of a web of trust by distribution of the CBIs. Furthermore, processing logic need not be aware of the CBI in order to create the web of trust, as simply forwarding an electronic communication that includes a CBI has the side effect of further publishing the CBI. Furthermore, receipt of a CBI in a reply message serves as an acknowledgement that the original CBI was received by a particular receiving system.

Figure 9:
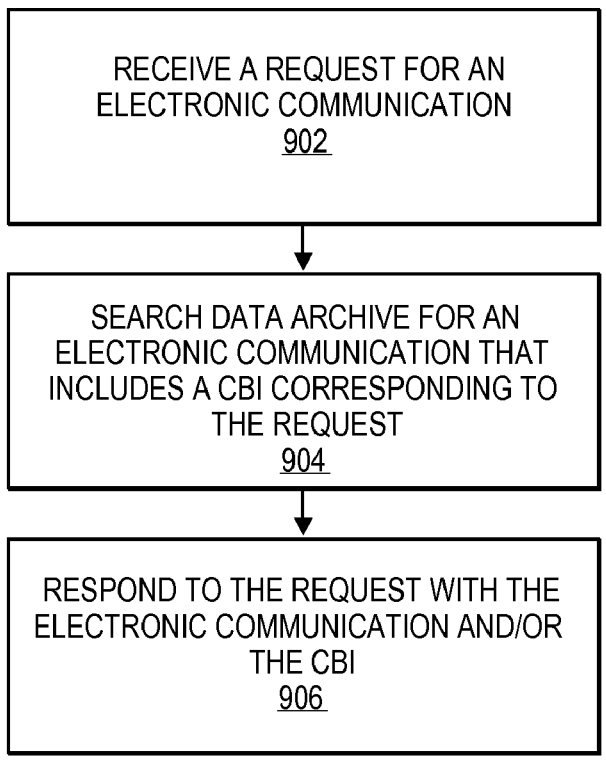
FIG. 9 is a flow diagram of one embodiment of a process for providing a content based identifier and/or electronic communication in response to a request.

FIG. 9 is a flow diagram of one embodiment of a process for providing a content based identifier and/or electronic communication in response to a request. The process is performed by processing logic that may comprise hardware (circuitry, dedicated logic, etc.), software (such as is run on a general purpose computer system or a dedicated machine), or a combination of both.

Referring to FIG. 9, the process begins by processing logic receiving a request for an electronic communication (processing block 902). In one embodiment, the request might be, for example, a subpoena for a part of a company email achieve to establish the date of data related to a particular hash, or something a particular hash depended on (e.g., a log of financial transaction hashes). The request may be any request for a published CBI. In one embodiment, the request may specify the date and time for a particular email.

Processing logic searches data archives for an electronic communication that includes a CBI corresponding to the request (processing block 904). In one embodiment, where CBIs from received communications, reply communication, and forwarded communications are logged, the log of CBIs is searched via extracted data stored with log entries. In one embodiment, a CBI is a globally unique identifier, and thus the desired CBI is all that is need to search data archives for the corresponding electronic communication with the CBI. Processing logic responds to the request with the electronic communication and/or CBI (processing block 906).

In embodiments discussed above, CBIs are included in electronic communications, forwarded, archived, etc., thereby creating webs of trust. Thus, in a situation, such as receiving a subpoena for proof of an electronic communication, a trusted party may be called upon to supply the proof. Business organizations that are required by law to save certain electronic communications, or remote/third-party archiving services that store information, for which entanglement has occurred, provide trusted sources of proof. That is, for example, since a business is required to store all email messages, an email message that contains a CBI may be used to validate a log of CBIs, or establish timing of the email itself.

Figure 10:
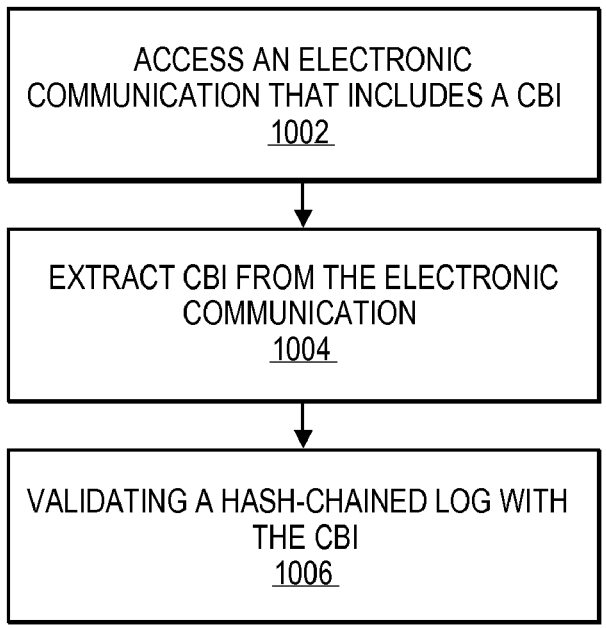
FIG. 10 is a flow diagram of one embodiment of a process for authenticating a hash-chained log.

FIG. 10 is a flow diagram of one embodiment of a process for authenticating a hash-chained log. The process is performed by processing logic that may comprise hardware (circuitry, dedicated logic, etc.), software (such as is run on a general purpose computer system or a dedicated machine), or a combination of both.

Referring to FIG. 10 the process begins by processing logic accessing an electronic communication that includes a CBI (processing block 1002), and extracting the CBI from the electronic communication (processing block 1004). In one embodiment, a header indicating the presence of the CBI is utilized by processing logic to extract the CBI. In one embodiment, processing logic extracts the CBI from known headers (e.g., Message-ID, In-Reply-To, etc. headers) of the communication.

Processing logic then validates a hashed chained log with the CBI (processing block 1006). In one embodiment, the validation procedures discussed above are utilized to authenticate an entire log, a log entry, a series of entries, etc.

An Example of a Computer System

FIG. 11 is a block diagram of a computer system that may perform one or more of the operations described herein. Referring to FIG. 11, computer system 1100 may comprise an exemplary client or a server computer system. Computer system 1100 comprises a communication mechanism or bus 1111 for communicating information, and a processor 1112 coupled with bus 1111 for processing information. Processor 1112 includes a microprocessor, but is not limited to a microprocessor, such as, for example, Pentium™, etc.

System 1100 further comprises a random access memory (RAM), or other dynamic storage device 104 (referred to as main memory) coupled to bus 1111 for storing information and instructions to be executed by processor 1112. Main memory 1104 also may be used for storing temporary variables or other intermediate information during execution of instructions by processor 1112.

Computer system 1100 also comprises a read only memory (ROM) and/or other static storage device 1106 coupled to bus 1111 for storing static information and instructions for processor 1112, and a data storage device 1107, such as a magnetic disk or optical disk and its corresponding disk drive. Data storage device 1107 is coupled to bus 1111 for storing information and instructions.

Computer system 1100 may further be coupled to a display device 1121, such as a cathode ray tube (CRT) or liquid crystal display (LCD), coupled to bus 1111 for displaying information to a computer user. An alphanumeric input device 1122, including alphanumeric and other keys, may also be coupled to bus 1111 for communicating information and command selections to processor 1112. An additional user input device is cursor control 1123, such as a mouse, trackball, trackpad, stylus, or cursor direction keys, coupled to bus 1111 for communicating direction information and command selections to processor 1112, and for controlling cursor movement on display 1121.

Another device that may be coupled to bus 1111 is hard copy device 1124, which may be used for printing instructions, data, or other information on a medium such as paper, film, or similar types of media. Furthermore, a sound recording and playback device, such as a speaker and/or microphone may optionally be coupled to bus 1111 for audio interfacing with computer system 1100. Another device that may be coupled to bus 1111 is a wired/wireless communication capability 1125 to communication to a phone or handheld palm device.

Note that any or all of the components of system 1100 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method, comprising:

accessing an electronic communication to obtain a content based identifier (CBI) contained in the electronic communication, the CBI added to the electronic communication by an outgoing electronic communication server that processed the electronic communication, wherein the CBI is embedded in a field of the electronic communication that does not get modified when the electronic communication is processed by a second communication server, wherein the field is a message identification header of the electronic communication; and using the CBI to validate integrity of a hash-chained log.

2. The method of claim 1, wherein the electronic communication is for a purpose other than validating integrity of hash-chained logs and the CBI embedded in the field of the electronic communication is for a purpose other than validating contents of the electronic communication.

3. The method of claim 1, wherein the CBI is a latest rolling hash in the hash-chained log and not based on content of the electronic communication.

4. The method of claim 1, wherein the electronic communication is accessed from a communications archive.

5. The method of claim 1, wherein the electronic communication is one of an electronic mail message, a voice over internet protocol communication, an instant message, or an electronic message formatted for syndication.

6. The method of claim 1, wherein the electronic communication is accessed from a legally required communications archive.

7. A non-transitory computer readable storage medium storing instructions thereon which, when executed by a system, causes the system to perform a method comprising:

accessing an electronic communication to obtain a content based identifier (CBI) contained in the electronic communication, the CBI added to the electronic communication by an outgoing electronic communication server that processed the electronic communication, wherein the CBI is embedded in a field of the electronic communication that does not get modified when the electronic communication is processed by a second communication server, wherein the field is a message identification header of the electronic communication; and using the CBI to validate integrity of a hash-chained log.

8. A system, comprising:

means for accessing an electronic communication to obtain a content based identifier (CBI) contained in the electronic communication, the CBI added to the electronic communication by an outgoing electronic communication server that processed the electronic communication, wherein the CBI is embedded in a field of the electronic communication that does not get modified when the electronic communication is processed by a second communication server, wherein the field is a message identification header of the electronic communication; and means for using the CBI to validate integrity of a hash-chained log.

9. A method, comprising:

adding a content based identifier (CBI) to an electronic communication by an outgoing electronic communication server that processes the electronic communication for transmission, the CBI a hash value and enables verification of integrity of a hash chained log, wherein the CBI is embedded in a field of the electronic communication that does not get modified when the electronic communication is processed by a second communication server, wherein the field is a message identification header of the electronic communication; and transmitting the electronic communication by the electronic communication server to a receiving system.

10. A non-transitory computer readable storage medium storing instructions thereon which, when executed by a system, causes the system to perform a method comprising:

adding a content based identifier (CBI) to an electronic communication by an outgoing electronic communication server that processes the electronic communication for transmission, the CBI a hash value and enables verification of integrity of a hash chained log, wherein the CBI is embedded in a field of the electronic communication that does not get modified when the electronic communication is processed by a second communication server, wherein the field is a message identification header of the electronic communication; and transmitting the electronic communication by the electronic communication server to a receiving system.

11. A system, comprising:

means for adding a content based identifier (CBI) to an electronic communication by an outgoing electronic communication server that processes the electronic communication for transmission, the CBI a hash value and enables verification of integrity of a hash chained log, wherein the CBI is embedded in a field of the electronic communication that does not get modified when the electronic communication is processed by a second communication server, wherein the field is a message identification header of the electronic communication; and means for transmitting the electronic communication by the electronic communication server to a receiving system.

12. A method, comprising:

receiving an electronic communication;

determining if the electronic communication includes a content based identifier (CBI), the CBI a hash value, added to the electronic communication by an outgoing electronic communication server that processed the electronic communication, that enables verification of integrity of a hash chained log, wherein the CBI is embedded in a field of the electronic communication that does not get modified when the electronic communication is processed by a second communication server, wherein the field is a message identification header of the electronic communication; and storing the CBI in a data archive.

13. The method of claim 12, wherein the hash value is a rolling hash value.

14. The method of claim 12, further comprising:

receiving a request to verify a received electronic communication; and responding to the request with an electronic mail message from the data archive that includes a CBI related to the request.

15. The method of claim 12, further comprising:

extracting identification data from the CBI that identifies the hash-chained log; and storing the identification data, along with the CBI, in the data archive.

16. A non-transitory computer readable storage medium storing instructions thereon which, when executed by a system, causes the system to perform a method comprising:

receiving an electronic communication;

determining if the electronic communication includes a content based identifier (CBI), the CBI a hash value, added to the electronic communication by an outgoing electronic communication server that processed the electronic communication, that enables verification of integrity of a hash chained log, wherein the CBI is embedded in a field of the electronic communication that does not get modified when the electronic communication is processed by a second communication server, wherein the field is a message identification header of the electronic communication; and storing the CBI in a data archive.

17. A system comprising:

means for receiving an electronic communication;

means for determining if the electronic communication includes a content based identifier (CBI), the CBI a hash value, added to the electronic communication by an outgoing electronic communication server that processed the electronic communication, that enables verification of integrity of a hash chained log, wherein the CBI is embedded in a field of the electronic communication that does not get modified when the electronic communication is processed by a second communication server, wherein the field is a message identification header of the electronic communication; and means for storing the CBI in a data archive.

* * * * *